(12) United States Patent
Wagner et al.

(10) Patent No.: US 12,517,026 B2
(45) Date of Patent: Jan. 6, 2026

(54) SAMPLE CELL AND SUPPORT ASSEMBLY FOR ENHANCED RHEOLOGICAL MEASUREMENTS OF SOFT MATTER AND MATERIALS

(71) Applicant: STF Technologies, LLC, Newark, DE (US)

(72) Inventors: Norman J. Wagner, Newark, DE (US); Richard Dombrowski, Lutherville, MD (US); John W. Lim, Wilmington, DE (US); Yu-Jiun Lin, Newark, DE (US)

(73) Assignee: STF Technologies, LLC, Newark, DE (US)

( * ) Notice: Subject to any disclaimer, the term of this patent is extended or adjusted under 35 U.S.C. 154(b) by 531 days.

(21) Appl. No.: 17/923,429

(22) PCT Filed: May 17, 2021

(86) PCT No.: PCT/US2021/032763
§ 371 (c)(1),
(2) Date: Nov. 5, 2022

(87) PCT Pub. No.: WO2021/236516
PCT Pub. Date: Nov. 25, 2021

(65) Prior Publication Data
US 2025/0060296 A1    Feb. 20, 2025

Related U.S. Application Data

(60) Provisional application No. 63/026,364, filed on May 18, 2020.

(51) Int. Cl.
*G01N 11/16* (2006.01)
*G01N 11/00* (2006.01)

(52) U.S. Cl.
CPC ...... *G01N 11/162* (2013.01); *G01N 2011/002* (2013.01); *G01N 2011/008* (2013.01)

(58) Field of Classification Search
None
See application file for complete search history.

(56) References Cited

U.S. PATENT DOCUMENTS 3,435,666 A    4/1969   Fann
3,935,726 A    2/1976   Heinz
(Continued)

OTHER PUBLICATIONS

Bergenholtz & Wagner, "Formation of AOT/Brine Multilamellar Vesicles" Langmuir 12:3122-6 (1996).
(Continued)

*Primary Examiner* — Daniel S Larkin
(74) *Attorney, Agent, or Firm* — Medler Ferro Woodhouse & Mills PLLC

(57) ABSTRACT

Sample cell devices and support assemblies are disclosed herein. The sample cell includes a novel concentric cylinder and coating design with a right-angle gear drive that enables enhanced rheological measurements in the 1-2 shear plane. The sample call can be used with a support assembly that enables efficient switching between the 2-3, 1-3 shear plane and the 1-2 shear plane without having to remove the sample and allowing for simultaneous imaging with, e.g., SANS or SAXS. Methods for using the sample cell and support assemblies in a 4D-SANS or 4D-SAXS sample environment are also disclosed.

22 Claims, 20 Drawing Sheets

(56) References Cited

U.S. PATENT DOCUMENTS

| | | | |
|---|---|---|---|
| 4,062,225 A | | 12/1977 | Murphy, Jr. et al. |
| 5,905,196 A | * | 5/1999 | Parshall .................. G01N 11/14 356/427 |
| 6,199,437 B1 | * | 3/2001 | Kumaraswamy ...... G01N 11/02 73/866 |
| 6,681,617 B1 | * | 1/2004 | Putman ................ G01N 11/142 73/54.27 |
| 7,500,385 B2 | * | 3/2009 | Liberatore ........... G01N 11/142 73/54.23 |
| 2005/0239210 A1 | | 10/2005 | Iida |
| 2014/0311226 A1 | | 10/2014 | Murray et al. |
| 2016/0216188 A1 | | 7/2016 | Khalde et al. |
| 2018/0217041 A1 | | 8/2018 | Urey et al. |

OTHER PUBLICATIONS

Eberle & Porcar, "Flow-SANS and Rheo-SANS applied to soft matter" Curr. Opin. Coll. Inter. Sci. 17:33-43 (2012).

Gentile et al., "Multilamellar Vesicle Formation from a Planar Lamellar Phase under Shear Flow" Langmuir 30:8316-25 (2014).

Gurnon et al., "Measuring Material Microstructure under Flow Using 1-2 plane flow-Small Angle Neutron Scattering" J. Vis. Exp. 84:e51068 (2014).

Gurnon and Wagner, "Microstructure and Rheology Relationships for Shear Thickening Colloidal Dispersions" J. Fluid Mechanics 769:242-76 (2015).

Helgeson et al., "A systematic study of equilibrium structure, thermodynamics, and rheology of aqueous CTAB/NaNO(3) wormlike micelles" J. Coll. Inter. Sci. 349:1-12 (2010).

Li et al., "Phase Behavior and Molecular Thermodynamics of Concervation in Oppositely Charged Polyelectrolyte/Surfactant Systems: A Cationic Polymer JR 400 and Antonio Surfactant SDS Mixture" Langmuir 28:10348-62 (2012).

Liberatore et al., "Microstructure and Shear Rheology of Entangle Wormlike Micelles in Solution" J. Rheol. 53:441-58 (2009).

Singh et al., "Fluid shear induces conformation change in human blood protein von Willebrand factor in solution" Biophys. J. 96:2313-20 (2009).

Street et al., "TDNMR characterization of a model crystallizing surfactant system" Colloids and Surfaces A: Physicochemical Eng. Aspects 406:13-23 (2012).

Thareja et al., "Influence of Surfactants on the Rheology and Stability of Crystallizing Fatty Acid Pastes" J. Am. Oil Chem. Soc. 90:273-83 (2013).

Wagner and Brady, "Shear thickening in colloidal dispersions" Physics Today 62(10):27-3 (2009).

Search Report and Written Opinion for International Application PCT/US2021/032763 mailed Aug. 24, 2021.

\* cited by examiner

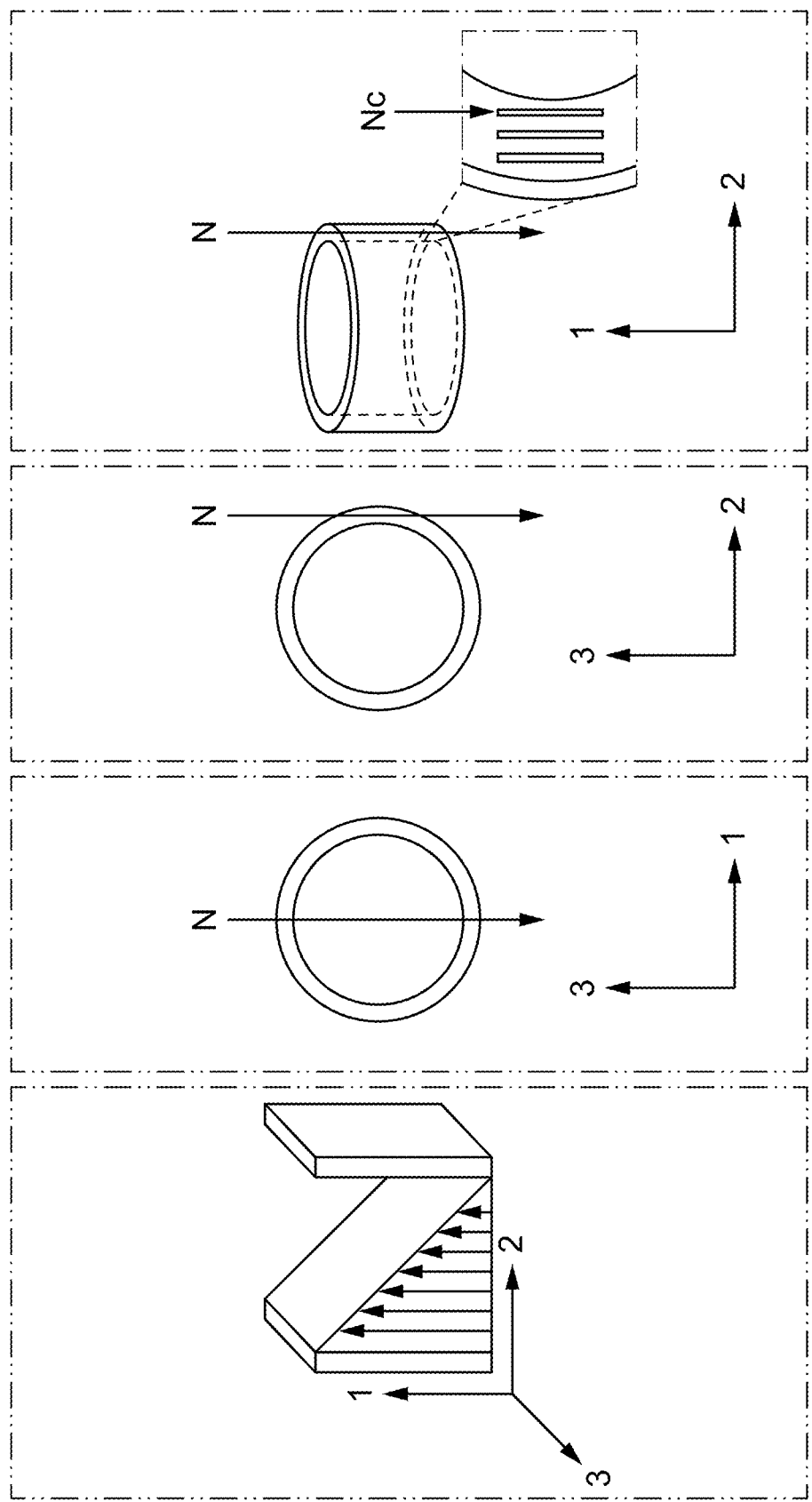

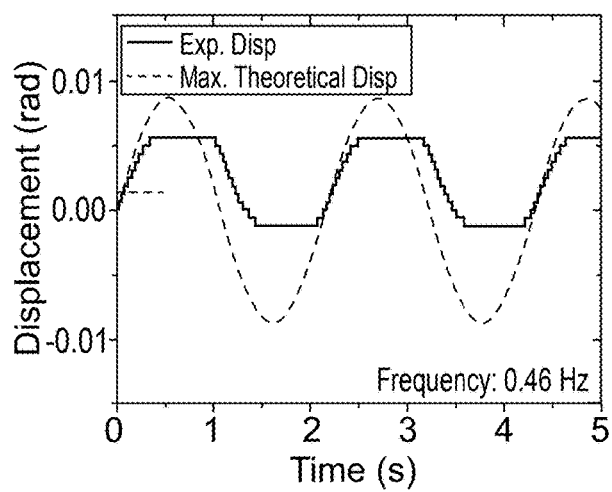
FIG. 22A
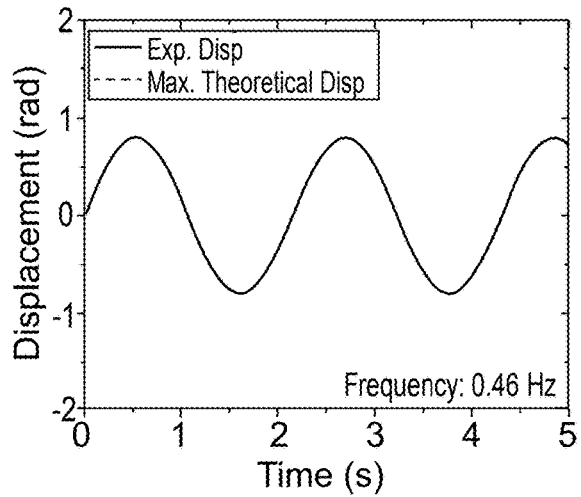
FIG. 22B
| | | R² values | | | | | | |
|---|---|---|---|---|---|---|---|---|
| Strain | 35 | 0.998 | 0.998 | 0.995 | 0.998 | 0.977 | 0.955 | 0.887 |
| | 28 | 0.998 | 0.999 | 0.999 | 0.996 | 0.979 | 0.931 | 0.876 |
| | 20 | 0.998 | 0.998 | 0.999 | 0.998 | 0.998 | 0.967 | 0.949 |
| | 15 | 0.997 | 0.998 | 0.998 | 0.996 | 0.998 | 0.963 | 0.870 |
| | 10 | 0.996 | 0.996 | 0.996 | 0.998 | 0.996 | 0.942 | 0.937 |
| | 7.5 | 0.994 | 0.995 | 0.994 | 0.998 | 0.994 | 0.938 | 0.927 |
| | 5.7 | 0.993 | 0.994 | 0.995 | 0.995 | 0.995 | 0.979 | 0.918 |
| | 4.5 | 0.991 | 0.991 | 0.993 | 0.997 | 0.999 | 0.968 | 0.873 |
| | 3.24 | 0.986 | 0.989 | 0.990 | 0.988 | 0.996 | 0.961 | 0.946 |
| | 1.62 | 0.982 | 0.987 | 0.985 | 0.989 | 0.986 | 0.969 | 0.990 |
| | 0.32 | 0.895 | 0.959 | 0.965 | 0.933 | 0.945 | 0.915 | 0.906 |
| | 0.16 | 0.893 | 0.874 | 0.888 | 0.869 | 0.699 | 0.714 | 0.847 |
| | | 0.1 | 0.22 | 0.46 | 1 | 2.15 | 4.64 | 10 |
| | | Frequency (Hz) | | | | | | |
FIG. 23

SAMPLE CELL AND SUPPORT ASSEMBLY FOR ENHANCED RHEOLOGICAL MEASUREMENTS OF SOFT MATTER AND MATERIALS

CROSS-REFERENCE TO RELATED APPLICATIONS

This is a U.S. national filing, pursuant to 35 U.S.C. § 371, of International Application PCT/US2021/032763, filed May 17, 2021, which claims benefit of U.S. Provisional Application No. 63/026,364, filed May 18, 2020, the entire content of each of which is incorporated by reference herein.

FIELD OF THE INVENTION

The present invention relates to sample cells and support assemblies for analysis of Theologically complex materials. In particular, coated sample cells with concentric cylinders are capable of enhanced rheological measurements of soft matter and materials in the 1-2 and 1-3, 2-3 shear planes suitable for use with simultaneous radiation scattering imaging of structural properties.

BACKGROUND OF THE INVENTION

An understanding of rheology, which is the study of deformation and flow of matter, especially the non-Newtonian flow of liquids and the plastic flow of solids, is essential for predicting the flow of fluids, including biological materials, and other materials and for developing and improving a wide range of products, including many consumer products. Rheologically complex materials, such as those with non-Newtonian flow characteristics, can change viscosity and strength upon the application of shear stress. Indeed, soft materials, metals, plastics, nanocomposites, self-assembled nanostructured materials, and many consumer products, such as detergents, skin creams, foods, and emulsions, are often processed with a thermal and shear history to create an important structure.

Some common household examples include structured skin care products, where temperature and shear are used to develop a very specific nanostructure in crystallizing surfactants essential to the products efficacy as well as consumer "feel" [see Street et al., 2012, Physicochemical Eng. Aspects 406:13-23; Thareja et al., 2013, J. Am. Oil Chem. Soc. 90:273-83; Li et al., 2012, 28:10348-62]. For instance, shampoos are structured, viscoelastic liquids consisting of self-assembled surfactants in solution that break and reform during flow and phase separate upon dilution to form coacervates for delivery to the skin and/or hair [see Liberatore et al., 2009, J. Rheol. 53:441-58; Helgeson et al., 2010, J. Coll. Inter. Sci. 349:1-12; Hoffmann et al., 2011, Tenside Surfactants Detergents 48:488-94]. Other examples include multilamellar vesicles that are used for detergents as well as for drug delivery and are typically created by shearing or extrusion and only exist because of this processing [see Begenholtz & Wagner, 1996, Langmuir 12:3122-6; Gentile et al., 2014, Langmuir 30:8316-25]. Important biological processes are often affected or even triggered by shear flow, such as the important conformational changes in the human blood protein von Willebrand Factor. Shear induces conformational changes that enable disulfide bond formation and self-assembly into a network of fibers. This important response is critical for repair of vascular injury, but can also be associated with acute coronary syndromes [see Singh et al., 2009, Biophys. J. 96:2313-20]. Shear can also induce shear thickening in dense suspensions, which may either prevent processing or itself be of use in the development of new field-responsive materials [see Wagner and Brady, 2009, Physics Today. 62 (10): 27-3; Gurnon and Wagner, 2015, J. Fluid Mechanics 769:242-76.]. Importantly, these examples are representative of a very large number of materials where flow-small-angle neutron scattering (flow-SANS) and rheo-SANS measurements are crucial to understanding structure formation.

The scientific and industrial research communities in the broad areas of soft matter, i.e., polymers, complex fluids, nano and colloidal solutions, coatings and inks, and biological materials, i.e., drug delivery, hydrogels, tissue engineering, need, but lack, the ability to effectively study these important materials under flow conditions. A recent comprehensive review identified how light scattering imaging, such as SANS, is essential for investigating material microstructure in the micron to nanometer range of length scales [see Eberle & Porcar, 2012, Curr. Opin. Coll. Inter. Sci. 17:33-43]. As noted therein, there are three rheologically important radiation scattering planes for imaging analysis of structure—the 1-3, 2-3, and 1-2 scattering planes. For rheologically complex materials, a better understanding of the structure-property relationship of these materials further requires rheological analysis in response to externally applied stress to the system. Thus, scientists often refer to the flow plane of the material; namely, the 1-3, 2-3 and 1-2 shear planes or flow planes, which correspond to the 1-3, 2-3, and 1-2 scattering planes, respectively. The 1-direction of flow is defined as the velocity direction of the flow, whereas the 2-direction is defined as the velocity gradient. Finally, the 3-direction is the vorticity of the flow, which describes the local spinning motion of the flow. Accordingly, a clearer understanding of the structure-property relationship of a material, especially one with non-Newtonian flow characteristics, requires simultaneous analysis of neutron, X-ray or light scattering or direct microscopy imaging and rheological measurement.

Unfortunately, while it is possible to take rheological measurements simultaneously with imaging in the 1-3 and 2-3 scattering planes (i.e., rheological measurements in the corresponding 1-3, 2-3 shear flow plane), rheology in the 1-2 shear flow plane has not been possible due to lack of adequate instrumentation [see Gurnon et al., 2014, J. Vis. Exp. 84: e51068]. Moreover, the 1-2 shear flow plane is the most interesting and important plane of flow for quantitative investigation of shear viscosity because it elucidates the orientation of the structure relative to the flow direction and informs the structure-property relationships essential for understanding the function of complex fluids and soft materials.

Thus, there remains a need in the art for sample measurement devices and assemblies capable of being used in a sample analysis environment that employs simultaneous imaging and enhanced rheological measurements in all three flow planes.

SUMMARY OF THE INVENTION

Described herein is a novel sample cell design that incorporates a specialized coating on its inner surfaces, a concentric cylinder Couette modified as a free-floating rotating "bob," and a right-angle gear drive for use in a sample analysis environment capable of enhanced rheological measurements and simultaneous probing radiation scattering in the 1-3, 2-3, and 1-2 shear flow planes. In particular, the cell geometry may also include a cylinder designed to be received in corresponding grooves in the sample cell, which is specially coated to allow the cylinder to rotate without actually making contact with the sample cell surfaces and without leaking of the sample material. Further, the sample cell design includes a right-angle drive gear that allows the cell it to be rotated to the XYZ orientation for radiation scattering in the 1-2 plane while rheological measurements are taken. This innovative sample cell design has reduced friction and sample leakage to enable increased accuracy in describing structure/property relationships of Theologically complex materials.

In addition, the sample cells described herein can be used with a modified cell support assembly comprised of two separate linear stages—an XY stage for alignment of the sample cell in the 1-3, 2-3 shear plane and an XYZ stage for alignment of the sample cell in the 1-2 shear plane. The novel cell support assembly of the present invention allows for simple horizontal rotation of the sample cell between the 1-3, 2-3 shear plane and the 1-2 shear plane configurations without removing the sample material from the sample cell and without requiring major adjustments to the scattering equipment and rheometer. Additionally, the cell support assembly stages include adjustment knobs to allow for adjustment of the geometry gap within the cell assembly for the 1-2 shear plane configuration as a manual process for zero gapping. Thus, the exemplary sample cells and support assemblies described herein can be adapted to any available radiation or light scattering sample environment, such as a SANS or SAXS environment, for structure imaging and simultaneous enhanced rheological measurements in all three flow planes.

In one aspect of the invention, disclosed herein is a sample cell for simultaneous measuring of rheological properties and interrogation of microstructure in all three primary planes defined by a simple shear field. In this aspect, the sample cell includes a cell geometry comprising a cylinder and a shaft; an enclosure with a base portion comprising a bottom surface, a cover portion comprising a top inner surface a bore for receiving the shaft of the cell geometry to allow rotation of the shaft within the bore, and a circumferential barrier wall that extends upwardly from the bottom inner surface of the base portion to the top inner surface of the cover portion thereby forming a circular compartment outwardly concentric to the cylinder of the cell geometry, wherein the cylinder of the cell geometry and the circumferential barrier wall form a concentric space for receiving a sample material; a right-angle gear drive in mechanical communication with the shaft of the cell geometry and configured for mechanical communication with a rotational rheometer shaft; and a coating disposed on surfaces within the circular compartment and further disposed on the cylinder of the cell geometry. In this arrangement, the shaft rotates within the bore of the cover portion without making contact with the cover portion, while the cylinder rotates within the enclosure without making contact with the base portion or the cover portion. Moreover, the coating prevents leakage of a sample material from the concentric space.

In another embodiment, the cylinder of the cell geometry further comprises a lateral wall and a sidewall, wherein the sidewall extends both above the lateral wall to form an upper circumferential lip and below the lateral wall to form a lower circumferential lip, and wherein the shaft extends axially from the lateral wall. Additionally, the base portion further comprises a lower groove for receiving the lower circumferential lip of the cell geometry to allow rotation of the lower circumferential lip within the lower groove while the cover portion further comprises an upper groove for receiving the upper circumferential lip of the cell geometry to allow rotation of the upper circumferential lip within the upper groove. In another embodiment, the coating is a hydrophobic coating, such as, but not limited to, silicone, a combination polytetrafluoroethylene/silicone lubricant, polytetrafluoroethylene, "lotus-leaf" inspired superhydrophobic coatings, nanoparticle coatings, oleophilic polymers, such as polyethylene and polypropylene, rubbers, or oils and hydrocarbon greases.

In another embodiment, sample cell includes a sample material disposed within the concentric space, wherein the cylinder applies an external stress to the sample material when the shaft is rotated by the right-angle gear drive. In some aspects, the base portion, cover portion, cylinder, circumferential barrier wall, or any combination thereof comprise a material selected from the group consisting of stainless steel, titanium, beryllium-quartz, and aluminum.

In some embodiments, the right-angle gear drive further comprises a first drive shaft at an angle of about 90 degrees in relation to a drive second shaft. Further, in some designs of the instant invention, the base portion comprises at least one sidewall that includes a first radiation beam window for receiving a beam of radiation selected from the group consisting of neutron radiation, X-ray radiation, photon radiation in the visible wavelength spectrum, ultraviolet radiation, and infrared radiation. In other aspects, the sidewall includes a second radiation beam window for receiving a beam of radiation. Moreover, the cover portion may also include a radiation beam window for receiving a beam of radiation. These radiation beam windows may comprise beryllium-quartz. Example radiation is X-ray radiation or neutron radiation; preferably, the beam of radiation is neutron radiation. In yet other embodiments, the cover portion comprises one or more sample loading ports. In still other embodiments the radiation beam may be light, or laser light, where the cell is made of optically transparent materials, such as quartz glass.

In particular embodiments, the right-angle gear drive is in mechanical communication with a rheometer, such as a rotational rheometer. In such embodiments, the sample cell may also be in the XYZ orientation for receiving a beam of radiation. In still other embodiments, the sample cell is disposed on a heat exchanger, which allows temperature control of the sample-cell member in the range from about −35 degrees C. to about 150 degrees C.

Another aspect of the invention features a 4D-rheo assembly that includes a (a) support assembly with a first cell support and a second cell support; (b) a sample-cell member that includes a cell geometry comprising a cylinder and a shaft, an enclosure with a bottom inner surface; a cover portion with a top inner surface and a bore for receiving the shaft of the cell geometry to allow rotation of the shaft within the bore, and a circumferential barrier wall that extends upwardly from the bottom inner surface of the base portion to the top inner surface of the cover portion thereby forming a circular compartment outwardly concentric to the cylinder of the cell geometry whereby the cylinder of the cell geometry and the circumferential barrier wall form a concentric space for receiving a sample material; and (c) a coating disposed on surfaces within the circular compartment and on the cylinder of the cell geometry. In this design, the shaft rotates within the bore of the cover portion without making contact with the cover portion, the cylinder rotates within the enclosure without making contact with the base portion or the cover portion, and the coating prevents leakage of a sample material from the concentric space. Additionally, the sample-cell member may be disposed on the first cell support in the XY orientation and configured to receive a beam of radiation in 1-3, 2-3 shear planes or disposed on the second cell support in the XYZ orientation to receive a beam of radiation in the 1-2 shear plane.

In some embodiments, the cylinder of the cell geometry further comprises a lateral wall and a sidewall, wherein the sidewall extends both above the lateral wall to form an upper circumferential lip and below the lateral wall to form a lower circumferential lip, and wherein the shaft extends axially from the lateral wall; the bottom inner surface further comprises a lower groove for receiving the lower circumferential lip of the cell geometry to allow rotation of the lower circumferential lip within the lower groove; and the top inner surface further comprises an upper groove for receiving the upper circumferential lip of the cell geometry to allow rotation of the upper circumferential lip within the upper groove.

In other embodiments, the coating is a hydrophobic coating, such as, but not limited to silicone, a combination polytetrafluoroethylene/silicone lubricant, polytetrafluoroethylene, a "lotus-leaf" inspired superhydrophobic coating, a nanoparticle coating, an oleophilic polymer, rubber, oil, or a hydrocarbon grease. Alternatively, the coating is a hydrophilic coating, such as, but not limited to, polyethylene oxide, an amide, a polyimides, polyvinylpyrrolidone, polyvinyl alcohol, polyurethane, polyacrylic acid, a polysaccharide, a Pluronic block copolymer, or a biopolymer. In some embodiments, the base portion, cover portion, cylinder, circumferential barrier wall, or any combination thereof, comprise a material selected comprising stainless steel, titanium, beryllium-quartz, or aluminum.

In other embodiments, the sample-cell member is disposed on the first cell support in the XY orientation with the shaft of the cell geometry configured for mechanical communication with a rheometer shaft. Alternatively, the sample-cell member may be disposed on the second cell support in the XYZ orientation with the shaft of the cell geometry in mechanical communication with a right-angle gear drive, which, in turn, is configured for mechanical communication with a rheometer shaft. In the latter embodiment, the right-angle gear drive may comprise a first drive shaft at an angle of about 90 degrees in relation to a second drive shaft.

In some aspects, the 4D-rheo assembly of the instant invention includes a cell member with a base portion that includes at least one sidewall with a first radiation beam window for receiving a beam of radiation. In other embodiments, the sidewall additionally comprises a second radiation beam window for receiving a beam of radiation. In yet other embodiments, the cover portion of the sample-cell member comprises a third radiation beam window for receiving a beam of radiation. In these embodiments, one or more of the radiation beam windows may comprise beryllium-quartz. In still other embodiments, the radiation beam may be X-ray radiation or neutron radiation; preferably, it is neutron radiation. In still other embodiments the radiation beam may be light, or laser light, where the cell is made of optically transparent materials, such as quartz glass.

In some embodiments of the 4D-rheo assembly, the shaft of the cell geometry is in mechanical communication, either directly or via a right-angle gear drive, with a rheometer, such as a rotational rheometer.

Another aspect of the invention features a 4D-rheo SANS sample environment that incorporates the 4D-rheo assembly described above. In yet other aspects, a method of analyzing a rheologically complex material is described that utilizes the 4D-rheo assembly described above and includes the steps of disposing a sample material within the concentric space, rotating the shaft of the cell geometry whereby an external rotational stress is applied to the material, applying a beam of neutron radiation to the sample-cell member, and detecting the scattering plane image.

Other features and advantages of the invention will be apparent by reference to the drawings, detailed description, and examples that follow.

BRIEF DESCRIPTION OF THE DRAWINGS

FIGS. 1A-1D are diagrams depicting the concentric circle flow geometries with accessible radiation scattering planes [adapted from Eberle & Porcar, 2012, Curr. Opin. Colloid Interface Sci. 17:33-43]. FIG. 1A illustrates a rectangular coordinate frame were the 1-, 2-, and 3-directions are defined as the velocity (v), velocity gradient ($\nabla v$), and vorticity ($\omega$) directions, respectively. FIG. 1B depicts the radial or 1-3 shear plane that allows for scattering in the 1-3 plane. FIG. 1C depicts the tangential or 2-3 shear plane that allows for scattering in the 2-3 plane. FIG. 1D depicts the 1-2 shear plane that allows for scattering in the 1-2 plane. The incident radiation beam cross-section is smaller than the fluid gap and allows for spatial resolution along the gap.

FIG. 3A depicts the sample-cell member in the 1-3, 2-3 shear planes (i.e., the XY orientation). The flow field for each of the planes are shown on the right. FIG. 3B depicts the scattering imaging relative to the 1-3 (top), 2-3 (bottom) shear planes. During experimentation, such as SANS or SAXS, a radiation beam will pass through the sample cell to scatter the radiation in either the 1-3 or 2-3 scattering planes. FIG. 3C depicts the sample-cell member in the 1-2 shear plane (i.e., the XYZ orientation). The flow field is shown on the right. FIG. 3D depicts the scattering imaging relative to the 1-2 shear plane. During experimentation, such as SANS or SAXS, a radiation beam will pass through the sample cell to scatter the radiation in the 1-2 scattering plane.

FIG. 4A is a front perspective view. FIG. 4B is a cross-sectional view.

FIG. 6A is the front perspective view, FIG. 6B is the top view, FIG. 6C is the side view, and FIG. 6D is the top view in the 1-2 shear plane configuration with the sample cell cover removed.

FIG. 14A is a peak hold flow sweep experiment of 0.0547 to 54.7 rad/s. The y-axis represents angular velocity, and the x-axis represents time. FIG. 14B is an oscillation experiment at 15 strain and 1 Hz frequency. The y-axis represents displacement, and the x-axis represents time. FIG. 14C is a flow startup experiment performed at shear rate of $10\ s^{-1}$. The y-axis represents angular velocity, and the x-axis represents time. FIG. 14D is a flow stop experiment performed at 1 strain. The x-axis represents displacement, and the y-axis represents time.

FIGS. 16 and 16B show the stress-shear (FIG. 16A) and viscosity-shear (FIG. 16B) relationships of glycerol sample for a 40 mm cone and plate and the sample-cell member in the 1-3, 2-3 and 1-2 shear planes. A flow sweep test method of shear rate varying from $10\text{-}1\ s^{-1}$ to $103\ s^{-1}$ was performed. In FIG. 16B, the y-axis represents viscosity, and the x-axis represents shear rate.

FIGS. 22A and 22B depict comparison of experimental and theoretical waveforms to determine the coefficient of determination (R2). FIG. 22A reveals that a strain of 0.16 at a frequency of 0.46 Hz resulted in an R2 of 0.888. FIG. 22B reveals that a strain of 15 at a frequency of 0.46 Hz resulted in an R2 0.998. The y-axis represents displacement, and the x-axis represents time.

FIG. 23 is a chart of various frequencies and strain amplitudes. R2 was obtained through LAOS testing of the right-angle gear drive compared to calculated theoretical values. LAOS testing was performed with a strain range of 0.16-35 and a frequency range of 0.1-10 Hz.

Figure 2A:
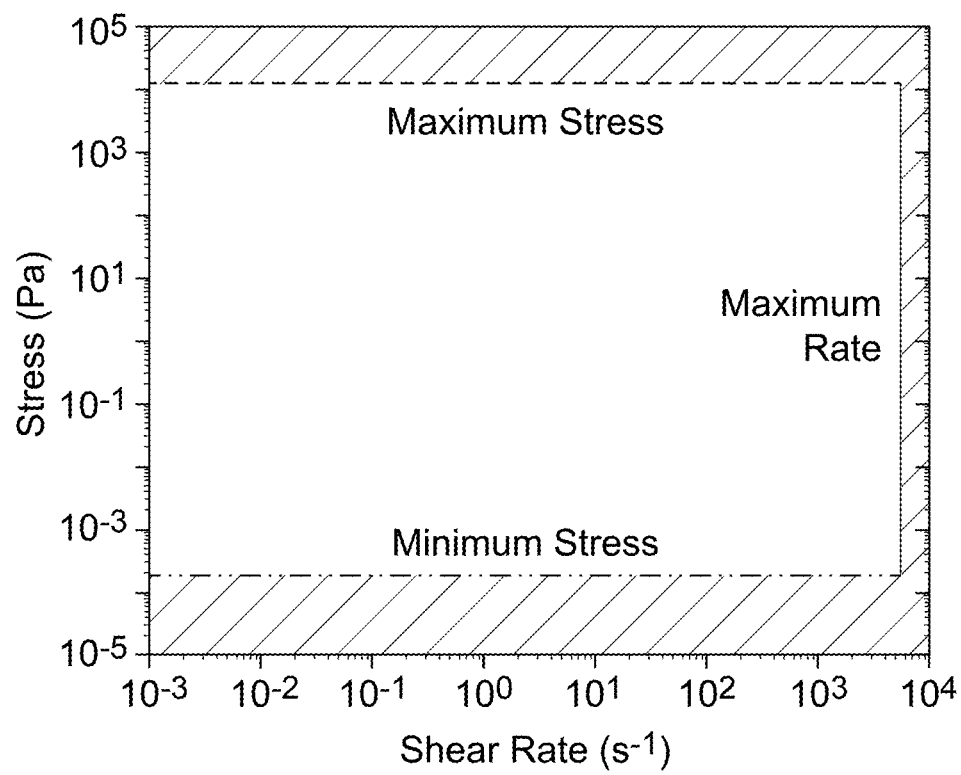
FIG. 2A is a graph showing the range of accessible stresses and shear rates measurable using the sample cell and support assembly of the present invention with a DHR20 rheometer. The maximum and minimum stress values are shown by the dashed and dashed/dotted lines, respectively. The maximum rate is indicated by the vertical dotted line. The y-axis represents stress (Pa), and the x-axis represents shear rate ($s^{-1}$).

The maximum theoretical value is shown by the dotted line. The y-axis represents displacement, and the x-axis represents time.

DETAILED DESCRIPTION OF THE INVENTION

Described herein are novel designs for sample cells and support assemblies suitable for use in a sample analysis environment suitable for taking enhanced rheological measurements simultaneously with radiation scatting imaging, such as small-angle neutron scattering (SANS), small-angle X-ray scatting (SAXS), small-angle light scattering (SALS), and the like. In particular, the innovative design of the sample cells and accessories described herein allow, for the first time, rheological analysis simultaneously with radiation scattering imaging in all three shear flow planes (i.e., the 1-3, 2-3 shear plane and the 1-2 shear plane) as previous designs did not allow for rheological analysis in combination with scattering in the 1-2 shear plane. The ability to take enhanced rheological measurements (i.e., response of the material to applied stress over time) and simultaneous radiation scattering imaging in all three flow planes can be referred to as "4D-Rheo" measurements.

The sample-cell members described herein include, among other things, three design improvements. First, the concentric cylinder cell geometry is designed to allow the cell to be positioned in the XYZ orientation for imaging of the 1-2 scattering plane while being simultaneously attached to a rheometer for taking enhanced rheological measurements without exhibiting leakage of the sample material or increased friction and torque on the cell geometry shaft. As described in more detail herein, in a preferred embodiment, the cell geometry comprises a cylinder having an upper circumferential lip and a lower circumferential lip received by corresponding grooves in the inner surfaces of the sample cell.

In order to prevent leakage of the sample material and to further reduce friction, a specialized coating is applied to the inner surfaces of the sample cell and cylinder to enable the cylinder to rotate within the sample cell and apply stress to the sample material without actually making contact with the surfaces of the sample cell. Thus, the combination of cell geometry and coating allows for a free-floating rotating "bob." This reduction in friction allows for more sensitive and accurate rheological measurements over time.

Third, provided herein is a right-angle gear drive that is rigidly coupled to the shaft of the cell geometry when the sample cell is in the XYZ orientation. The upper end of the right-angle gear drive is then coupled to the shaft of the rheometer. In this design, the rotational stress output from the rheometer is translated 90 degrees to the cell geometry of the sample cell. Likewise, the effect of the externally-applied stress on the sample material can be measured by the rheometer (e.g., translated back to the shaft of the rheometer as oscillations). The right-angle gear drive design not only enables the user to attach a rheometer to the sample cell in the XYZ orientation, but additionally reduces the influence of increased weight on the shaft of the cell geometry.

Also provided herein is a sample cell support assembly that includes a XY stage and an XYZ stage. For analysis of sample materials in the 1-3, 2-3 shear plane, the sample cell is placed on the XY cell support, and the shaft of the cell geometry is coupled to the rheometer output shaft. The XY stage includes adjustable knobs for precise positioning of the XY cell support and sample-cell member to align an incoming beam of radiation with the desired radiation scattering plane (1-3 scattering plane or 2-3 scattering plane). In this configuration, the user can record rheological measurements over time while imaging the structure of the material in the 1-3 and/or 2-3 scattering planes. Next, the sample cell is then rotated horizontally 90 degrees to the XYZ orientation and placed on the XYZ cell support. In this position, the shaft of the cell geometry is coupled to the rheometer with the right-angle gear drive. The XYZ stage includes adjustable knobs for precise adjusting of the XYZ cell support and sample-cell member to align an incoming beam of radiation with the 1-2 shear plane. Particularly, the XYZ stage allows for the adjustment of the geometry gap within the cell assembly as a manual process for zero gapping in the 1-2 shear plane, which is the process by which the cylinder of the cell geometry is aligned along the rotation axis with the cylindrical barrier wall and sets the point at which the cylinder of the cell geometry makes contact with the bottom of the sample-cell member. After the zero gap is determined, the cell geometry is moved away from the bottom of the sample-cell member at a set distance to allow for rotation. In this configuration, the user can record rheological measurements over time while imaging the structure of the material in the 1-2 scattering plane. As such, rheological measurements can be taken simultaneously with image scattering in all three shear planes and without having to remove the sample material from the sample cell.

The sample cell and support assembly described herein is suitable for use with, e.g., a 4D-Rheo SANS sample environment and will greatly increase the measurement capability from the prior art level of 2D measurements to the full 3D structure with enhanced time resolution (i.e., 4D). Moreover, the sample cell and support assembly of the present invention is compatible with the isotope reactors and radiation sources (e.g., neutron sources) at existing facilities worldwide. The sample cell and support assembly will now be described in more detail.

Definitions

Unless defined otherwise, all technical and scientific terms used herein have the same meaning as those commonly understood by one of ordinary skill in the art to which this invention belongs. Standard techniques are used unless otherwise specified. Although methods and materials similar or equivalent to those described herein can be used in the practice or testing of the present disclosure, suitable methods and materials are described below. The materials, methods and examples are illustrative only, and are not intended to be limiting. All publications, patents and other documents mentioned herein are incorporated by reference in their entirety.

Ranges, if used, are used as shorthand to avoid having to list and describe each and every value within the range. Any value within the range can be selected, where appropriate, as the upper value, lower value, or the terminus of the range.

As used herein, the singular forms "a," "an," and "the" include the plural referents unless the context clearly indicates otherwise. Likewise, the terms "include", "including", and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The term "about" refers to the variation in the numerical value of a measurement, e.g., diameter, weight, length, velocity, viscosity, volume, angle degrees, etc., due to typical error rates of the device used to obtain that measure. In one embodiment, the term "about" means within 5% of the reported numerical value, preferably, the term "about" means within 3% of the reported numerical value.

The term "comprising" is intended to include embodiments encompassed by the terms "consisting essentially of" and "consisting of." Similarly, the term "consisting essentially of" is intended to include embodiments encompassed by the term "consisting of."

The term "flow-SANS" as used herein refers to a sample environment that imposes an external stress field on the sample during SANS measurement, but does not include simultaneous rheological measurement.

The term "rheology" as used herein refers to the deformation and flow of matter.

The term "rheo-SANS" as used herein refers to a sample environment that imposes an external stress field on a sample during SANS measurement in combination with a measurement of at least one rheological material function.

The term "scattering" as used herein refers to a general physical process where some forms of radiation, such as light, neutrons, or X-rays, are forced to deviate from a straight trajectory by one or more paths due to localized non-uniformities in the medium through which they pass. The term "scattering plane" as used herein refers to a two-dimensional (2D) projection of the coordinate frame normal to the incident beam of radiation.

The terms "shear plane", "flow plane" and "shear flow plane" are used interchangeably herein to refer to the XY or XYZ linear position of the sample cell. A "1-3, 2-3 shear plane" means that the sample cell is in the XY linear position, such that if a radiation beam were directed to the sample, it would produce radiation scattering in the 1-3 or 2-3 scattering planes, depending upon the precise alignment of the incident radiation beam with the flow of sample material. A "1-2 shear plane" means that the sample-cell member is in the XYZ linear position, such that if a radiation beam were directed to the sample, it would produce radiation scattering in the 1-2 scattering plane.

The term "shear strain" as used herein refers to the length of deformation of a material divided by the perpendicular length in the plane of the force applied.

The term "shear stress" as used herein refers to a component of stress that is co-planar with a material cross section.

The terms "small-angle neutron scattering" or "SANS" are used interchangeably herein to refer to a scattering technique using accelerated neutrons as the source of radiation. Preferably, the angle of deflection is between about 0.1 degrees and about 20 degrees; more preferably between about 0.1 degrees and about 10 degrees.

The terms "small-angle scattering" or "SAS" are used interchangeably herein to refer to a scattering technique based on deflection of collimated radiation away from the straight trajectory after it interacts with structures that are much larger than the wavelength of the radiation. Preferably, the angle of deflection is between about 0.1 degrees and about 20 degrees; more preferably between about 0.1 degrees and about 10 degrees.

The terms "small-angle X-ray scattering" or "SAXS" are used interchangeably herein to refer to a scattering technique using X-rays as the source of radiation. Preferably, the angle of deflection is between about 0.1 degrees and about 20 degrees; more preferably between about 0.1 degrees and about 10 degrees.

The term "vorticity" as used herein refers to the local spinning motion of a continuum near some point. The "vorticity" of a 2D flow is perpendicular to the plane of the flow.

The terms "XY position" and "XY orientation" are used interchangeably herein and refer to the linear position of the sample cell enabled for radiation scattering when the sample cell is in the 1-3, 2-3 shear plane. In the "XY orientation," the bottom of the sample cell based is placed on the support stage or other support surface with the shaft of the cell geometry extending along a vertical axis (i.e., perpendicular to the support stage or surface).

The terms "XYZ position" and "XYZ orientation" are used interchangeably herein and refer to the linear position of the sample cell enabled for radiation scattering when the sample cell is in the 1-2 shear plane. In the "XYZ orientation," a sidewall of the sample cell base is placed on the support stage or other support surface with the shaft of the cell geometry extending along a horizontal axis (i.e., parallel to the support stage or surface).

The term "zero gapping" as used herein refers to the process by which the cylinder of the cell geometry is aligned along the rotation axis with the cylindrical barrier wall, setting the point at which the cylinder of the cell geometry makes contact with the bottom of the sample-cell member. After zero gap is determined, the cylinder of the cell geometry is moved away from the bottom of the sample-cell member at a set distance to allow for rotation.

Sample-Cell

As one having ordinary skill in the art would readily appreciate, when materials (e.g., fluids, solids, or elastic solids) are exposed to an incident beam of radiation, non-uniformities in these materials can force the radiant beam to deviate from the straight trajectory by one or more paths. This scattering, or deviation, of the radiant beam can be measured as scattering planes. Preferably, the scattering is small angle scattering (SAS) with a deflection angle of between about 0.1 degrees and about 20 degrees; more preferably, between about 0.1 degrees and about 10 degrees. Generally, one or more scattering planes are used to provide information regarding, among other things, the structure/property relationship of the fluid or elastic solid. These scattering planes include the 1-3 scattering plane, the 2-3 scattering plane, and the 1-2 scattering plane. In combination with the structural/property imaging of the sample material created by the radiation scatting, shear flow can also be measured in these same planes. When referring to the orientation of flow, the 1-3, 2-3, and 1-2 scattering planes are referred to as the 1-3, 2-3 and 1-2 shear or flow planes.

For measuring shear flow, the relevant indices may include the flow (v), velocity gradient ($\nabla v$), and vorticity ($\omega$) directions. As shown in FIG. 1A, the flow, velocity gradient, and vorticity are identified by the directions 1-, 2-, and 3-, respectively. In turn, the scattering or shear planes of interest may be defined as 1-3, 2-3, and 1-2. In some embodiments, the 1-2 shear plane provides the most relevant information for describing structure/property relationships of rheologically complex materials. Particular rheologically complex materials include those that are non-Newtonian such that the viscosity depends on the shear rate and possibly the shear history and time. Notably, rheologically complex fluids often exhibit viscoelasticity and/or thixotropy.

Figure 2B:
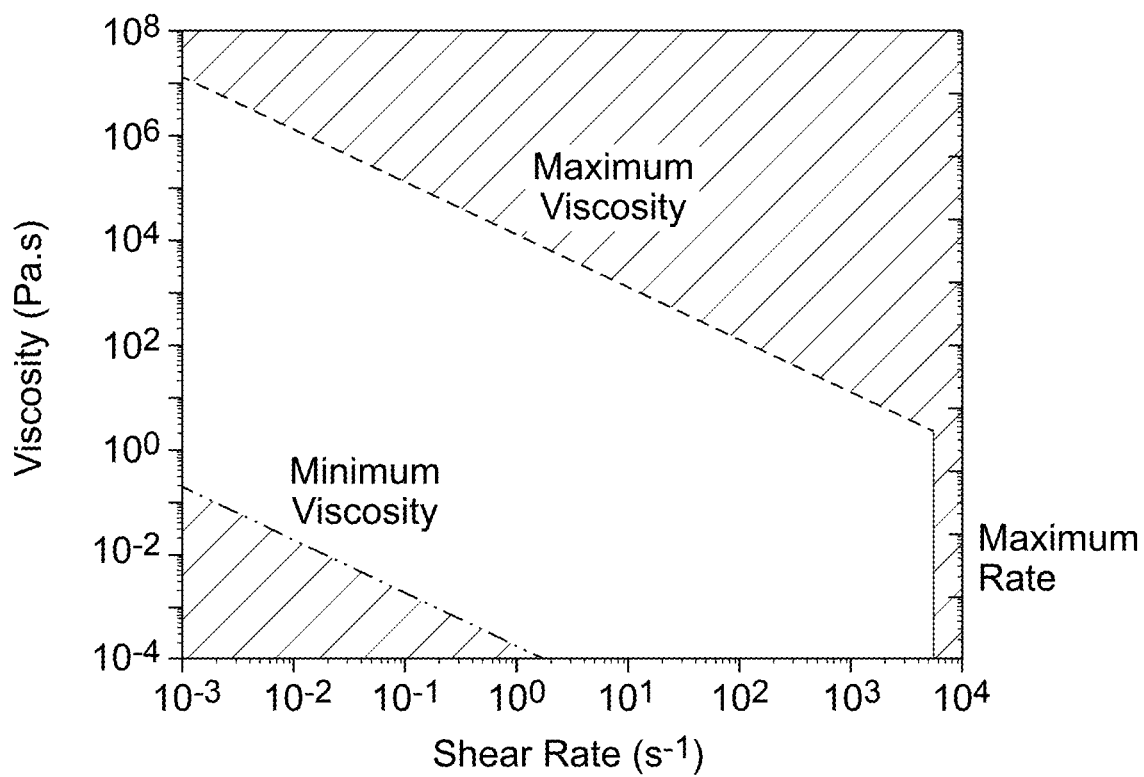
FIG. 2B is a graph showing the range of viscosities measurable using the sample cell and support assembly of the present invention with a DHR20 rheometer. The maximum and minimum viscosities are shown by the dashed and dashed/dotted lines, respectively. The maximum rate is indicated by the vertical dotted line. The y-axis represents viscosity (Pas), and the x-axis represents shear rate ($s^{-1}$).
Figure 2C:
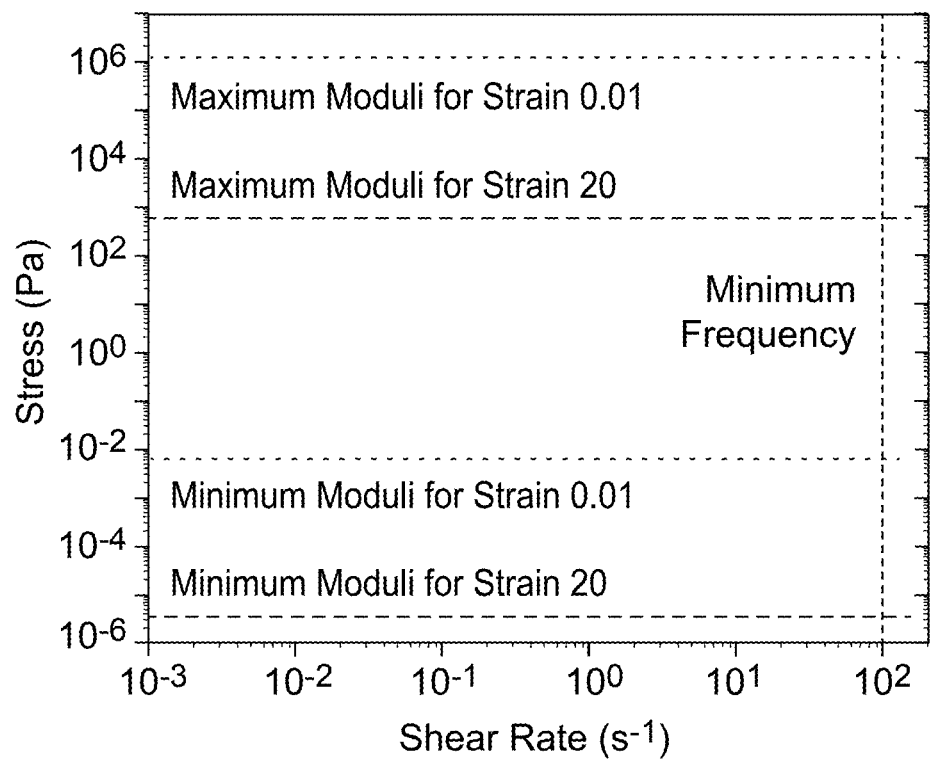
FIG. 2C is a graph showing the range of accessible moduli in oscillatory mode given for two typical values of stain amplitude. The minimum and maximum moduli for both strain 0.01 and strain 20 are indicated. The maximum frequency is indicated by the vertical dotted line. The y-axis represents modulus (Pa), and the x-axis represents frequency (Hz).

FIGS. 2A-2C demonstrate the range of accessible stress and shear rates, the measurable range of viscosities, and the range of accessible moduli using an oscillatory-applied force of a non-exemplary sample environment comprising a sample-cell member and cell support assembly with a DHR20 rheometer (TA Instruments, Delaware, USA) in the 1-3 and 2-3 shear planes. As one having ordinary skill in the art would understand, these specifications are determined by the mechanical limits of the rheometer coupled with the cell-constant for this specific rheological sample environment. Other limits may apply to specific materials, where effects such as secondary flows and instrument inertia may affect the measurements, as in all standard rheometry. Moreover, when implemented in the 1-2 shear plane mode, the design of the right-angle gear drive may limit the minimum stress, minimum viscosity, and minimum dynamic moduli that can be measured.

Measurement of shear flow can be conducted in a sample environment that includes a sample-cell member, an external stress applying member, a radiation beam source, and a detector. Suitable radiation beams for use herein are readily available in the art and include X-rays (e.g., rheo X-ray photon correlation spectroscopy and rheo-SAXS), accelerated electrons (e.g., Cryo-transmission electron microscopy), optical radiation (e.g., rheo-SALS and rheo-optics), or neutron beams (e.g., rheo-SANS). In preferred embodiments, the radiation beam is a neutron beam created by accelerating hydrogen isotopes, e.g., deuterium, tritium, or a mixture of deuterium and tritium. In one particular embodiment, the radiation beam source is produced by a neutron velocity selector with a rotation speed of between about 2,800 rpm and about 28,300 rpm and a tilt angle of about −10 degrees to about 10 degrees. This produces beams with wavelengths ranging from about 4 angstroms to about 30 angstroms. Further, the neutron radiation is typically passed through a collimation system to produce a parallel beam of neutron radiation to impact the sample, which is disposed within the sample-cell member. Finally, the scattering of the neutron radiation can be detected using any art-standard means, such as an 3He multidetector.

In addition to the radiation beam and detector, measurement of the flow of a material within the sample-cell member requires an external stress field be applied to the material while the radiation beam is directed to and penetrating the material within the sample-cell member therefore providing information about the dynamic structure/property relationships and enhanced rheological characteristics of that material. In general, samples are held within a sample-cell member that comprises certain accessories, or geometries, that impose the external stress field to the material for measurement in a SAS (e.g., SAXS or SANS) environment. Of particular use herein are geometries that apply an external stress field to the material by rotation. Such geometries may include, but are not limited to, a concentric cylinder Couette, cone and plate, parallel plate, and torsion rectangular. In a preferred embodiment, the sample cell geometry used for applying a rotation external stress field is a concentric cylinder Couette geometry, a cone and plate geometry, or a parallel plate geometry; more preferably, the geometry is a concentric cylinder Couette geometry with modifications as described below. As the external stress field is applied to a sample, the radiation beam is directed on the sample such that the radiation beam is scattered in one or more scattering planes. In particular embodiments, the radiation beam is scattered in at least the 1-2 scattering plane. In other embodiments, the radiation beam is scattered in the 1-3 plane and/or the 2-3 scattering plane. In preferred embodiments, the radiation beam is first scattered in 1-3 and 2-3 scattering planes and then scattered in the 1-2 scattering plane, or vice versa. At the same time, rheological measurements can be taken with the sample material in the 1-3, 2-3 and 1-2 shear planes.

FIGS. 1B-1D are illustrations depicting a material upon which a rotational external stress field is applied with accessible 1-3, 2-3, and 1-2 neutron radiation scattering planes using a concentric cylinder Couette geometry. The neutron beam N penetrates the material in the radial flow resulting in scattering of the neutron radiation in the 1-3 plane or in the tangential flow resulting in scattering of the neutron radiation in the 2-3 scattering plane (see FIGS. 1B and 1C, respectively). Alternatively, the neutron beam N can be directed to the sample-cell to penetrate the material in the 1-2 shear plane, which typically requires reorienting the rotation of the material (see FIG. 1D; Nc refers to the cross-section of the neutron beam). The shear/scattering planes of a sample material in an exemplary sample-cell member of the invention is better depicted in FIGS. 3A-3D.

Figure 3A:
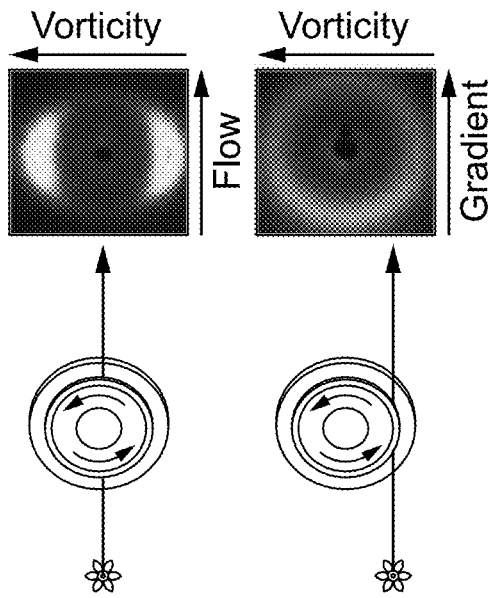
FIGS. 3A-3D depict an exemplary embodiment of a sample-cell member of the present invention.
Figure 3C:
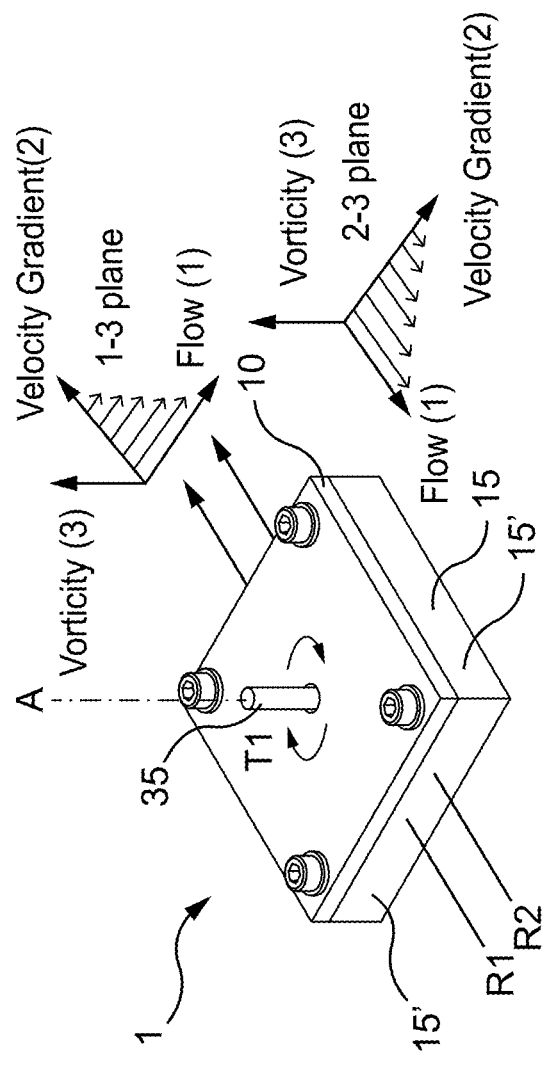
Figure 3B:
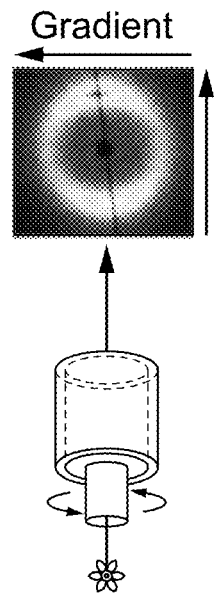
Figure 3D:
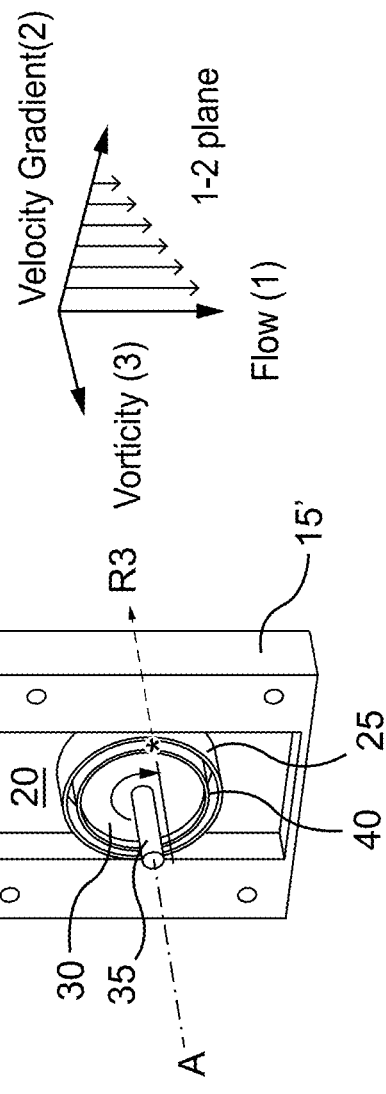
Figure 4A:
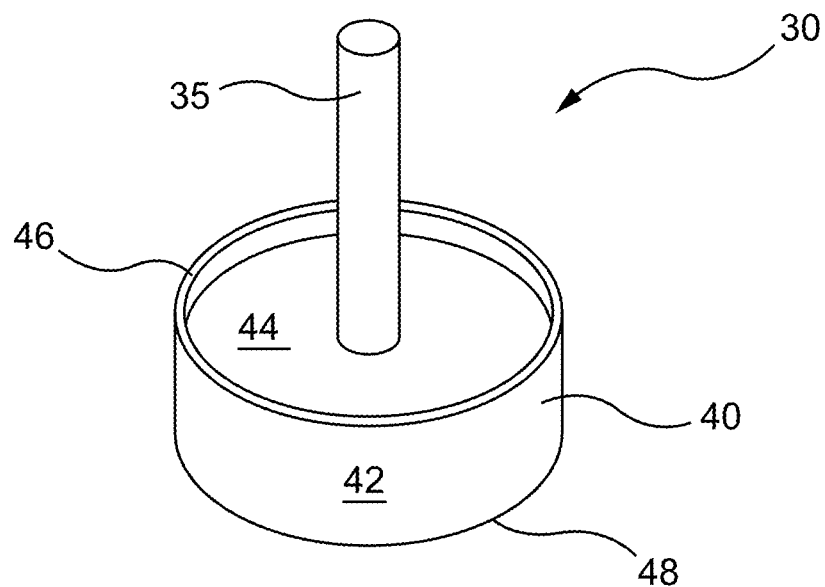
FIGS. 4A and 4B depict diagrams of an exemplary embodiment of a cell geometry for use with the sample-cell member.
Figure 4B:
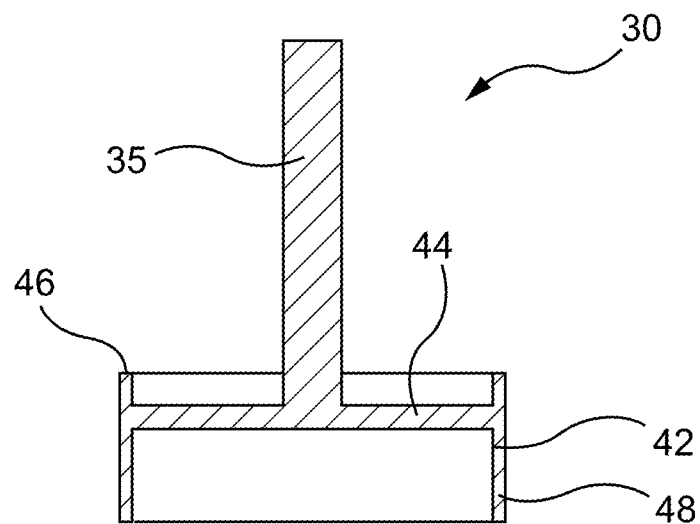

FIGS. 3A and 3B depict a non-limiting exemplary embodiment of a sample-cell member of the invention capable of rheological analysis in all three shear planes (i.e., 1-3, 2-3 and 1-2 shear planes), which would allow for simultaneous imaging in the corresponding radiation scattering planes. The sample-cell member 1 is one exemplary embodiment of the invention and includes a cover 10, base 15, and a hollow inner compartment 20 within which is disposed a cylindrical barrier wall 25 that forms a concentric configuration with the cell geometry 30. The cell geometry 30 includes a cylinder 40 that forms a sidewall 42 connected to a shaft 35 by a lateral wall 44 (see FIGS. 4A and 4B). The part of the cylinder 40 that extends upward from the lateral wall 44 forms an upper circumferential lip 46, while the part of the cylinder 40 that extends below the lateral wall 44 forms a lower circumferential lip 48.

When the cover 10 and base 15 are closed, the cylindrical barrier wall 25 extends from the floor of the base 15 to the bottom surface of the cover 10 to completely close off a circular compartment within the enclosure. The shaft 35 of the cell geometry 30 passes through a bore in the cover 10 and is accessible externally to the sample-cell member 1 allowing the cell geometry 30 to be rotated within the sample-cell member 1. The concentric arrangement of the cell geometry 30 and cylindrical barrier wall 25 form a concentric space between the cell geometry sidewall 42 and the barrier wall 24 in which is disposed the sample material 5 (see FIGS. 3C and 5).

To create the external stress field, the cell geometry 30 is attached to a motor element (not shown). The motor element rotates the cell geometry 30 to impart a rotational torque force (T1) to the sample material 5. In some embodiments, the motor element is a manually operated motor element, e.g., a hand crank. In preferred embodiments, the motor element is electronically operated, such as an electrical motor, a spring, a magnetic driver, or a drag cup motor; more preferably, a drag cup motor is used. In more preferred embodiments, the motor element is part of a rheometer as will be described in more detail below and which allows rheological measurements to be taken. In this particular embodiment, the cell geometry 30 is rotational about an axis A in a clockwise direction to apply torque stress (T1) to the sample 5. In other embodiments, the rotation of the cell geometry 30 is in a counter-clockwise direction.

To produce the scattering planes, a radiation beam can be directed to the sample-cell member 1. In preferred embodiments, the radiation beam is a neutron beam. In the embodiment shown in FIGS. 3A and 3B, the sample material 5 is loaded into the space between the cylinder sidewall 42 of the cell geometry 30 and the cylindrical barrier wall 25 (not visible in FIG. 3A). The cover 10 is disposed on the base 15 to enclose the sample material 5 such that it does not leak out of the sample-cell member 1. Moreover, the side walls 15' of the base 15 as well as the barrier wall 25 and cell geometry 30 will be easily penetrated by the radiation beam to reach the sample material 5. As such, one or more of the components of the sample-cell member 1 may be comprised of a material particularly suitable for allowing radiation, such as neutron beams, to easily penetrate. Thus, materials suitable for the sample-cell member components of the invention for use in a neutron beam include, but are not limited to stainless steel, titanium, beryllium-quartz, aluminum, and plastic. In particular embodiments, the radiation source is a neutron beam and the sample-cell member, including the cell geometry, comprise stainless steel, titanium, beryllium-quartz, aluminum, or a combination of one or more of these materials. Alternatively, optical light or laser light can be used as a source of radiation. In such an embodiment, the sample cell typically would be made of optically transparent material, such as quartz glass.

As the cell geometry 30 rotates, e.g., in a clockwise direction, torque (T1) is applied to the material 5. A radiation beam can be directed to penetrate the material 5 radially (R1) to the material flow or tangentially (R2) to the material flow to produce scattering in the 1-3 shear plane and 2-3 shear plane, respectively (see FIG. 3A; material not visible). To access the 1-2 scattering plane, the sample-cell member 1 can be rotated horizontally about 90 degrees such that axis A of the cell geometry shaft 35 is parallel to the support surface to allow the radiation beam (R3) to penetrate the cover 10 as it is directed through the cross-section of the flowing material 5 to produce scattering in the 1-2 shear plane (see FIG. 3B). As such, information regarding the structure/property relationships of rheologically complex materials can be examined in all three shear planes in a single sample-cell member without having to remove or change the sample material.

The unique design of the sample-cell member described herein enables measurements of the full 3-dimensional structure of the material with enhanced time resolution to create, e.g., a 4D Rheo-SAS environment. Thus, in preferred embodiments, the cell geometry is attached to a rheometer. Suitable rheometers are available in the art (e.g., DHR Rotational Rheometer, TA Instruments, Delaware, USA), which can be adapted for use herein. In general, the rheometer will have a motor element and a shaft that attaches to the shaft of the cell geometry to rotate the cell geometry and apply stress to the sample material. Moreover, the rheometer may have a displacement sensor or encoder configured to measure oscillatory displacement of the rotating shaft over time, which, in turn, can be used to calculate the mechanical response from the sample material as rotational external stress is applied to the sample material.

Figure 5A:
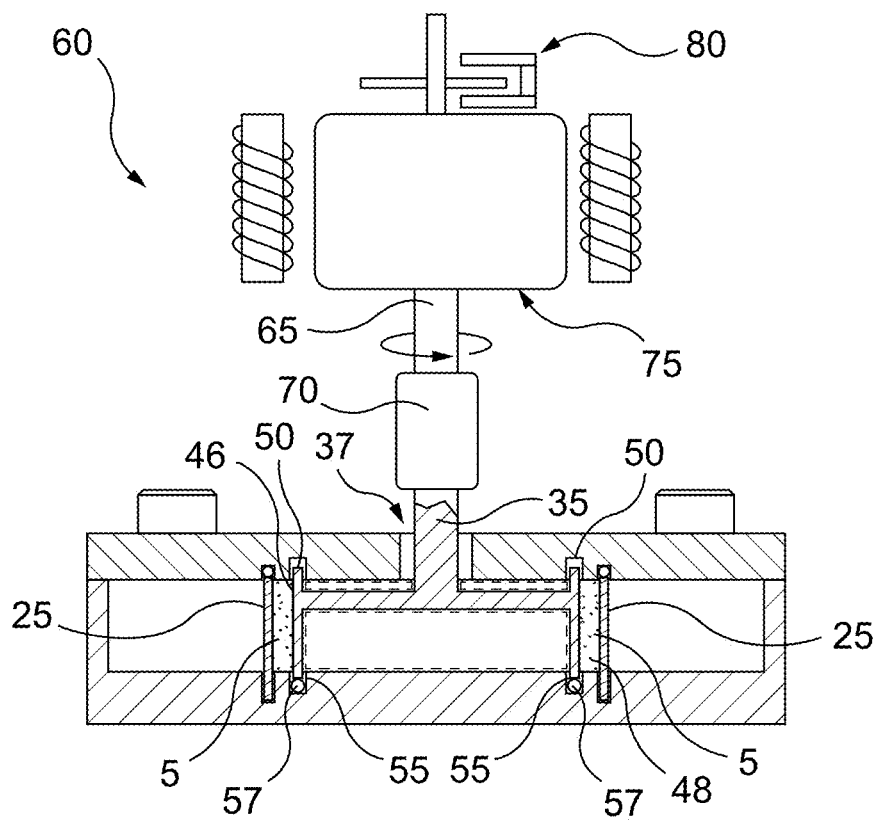
FIGS. 5A and 5B depict cross-sectional diagrams of an exemplary sample-cell member attached to a rheometer in the XY position, or the 1-3, 2-3 shear plane (FIG. 5A), and the XYZ position, or the 1-2 shear plane (FIG. 5B). The dotted line represents the hydrophobic coating on the inner surfaces of the sample-cell member.

Shown in FIG. 5A is a cross-section of the exemplary sample-cell member attached to the motor and shaft portion of a rotational rheometer in the XY linear position for analysis of the 1-3, 2-3 shear plane. The rotational rheometer 60 includes a motor 75, such as a drag cup motor, that rotates according to a pre-set stress amount programmed into the rheometer by the user. Operation of a rheometer, such as the one described here, is well within the purview of the skilled artisan and will not be described further. The rheometer shaft 65 is mechanically coupled to the cell geometry shaft 35 with a coupler 70 or a collet chuck, such as, but not limited to a double-ended Swiss collet chuck. Thus, as the motor 75 rotates the rheometer shaft 65, the cell geometry 30 rotates in response to apply the rotational stress to the sample material 5. In this manner, the user can control the amount of stress applied to the system. The rheometer 60 further includes a displacement sensor 80, which measures the oscillatory displacement of the rheometer shaft 65. This electromechanical drive system can also be used with a controller to control the strain and strain rate, thereby creating a controlled rate rheometer. In the orientation shown in FIG. 5A, rheological measurements can be recorded while a radiation beam is applied to the sample material 5 for imaging analysis of 1-3 radiation scattering plane and the 2-3 radiation scattering plane depending upon the precise alignment with the incident radiation beam.

Figure 5B:
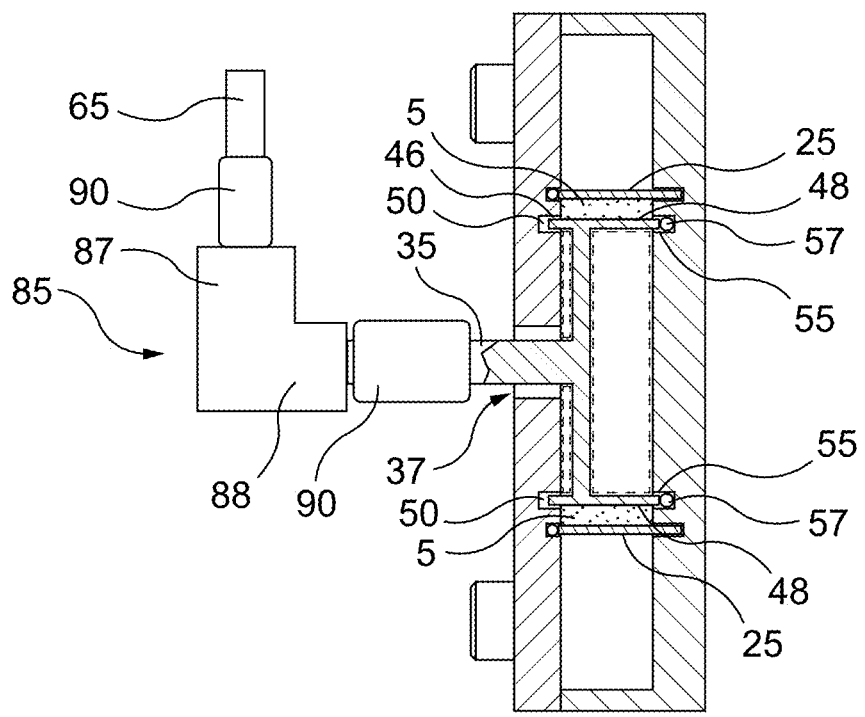
Figure 6A:
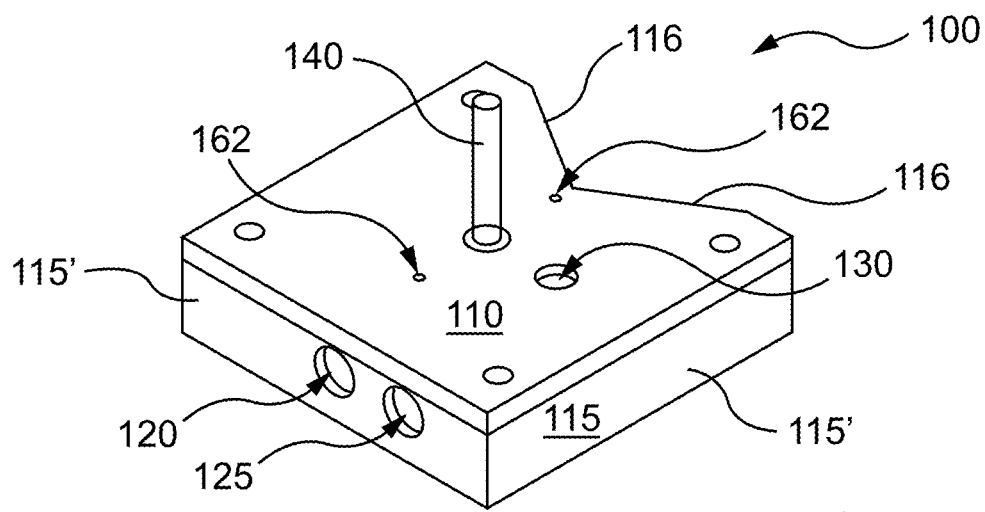
FIGS. 6A-6D are illustrations of an exemplary embodiment of a sample-cell member.
Figure 6B:
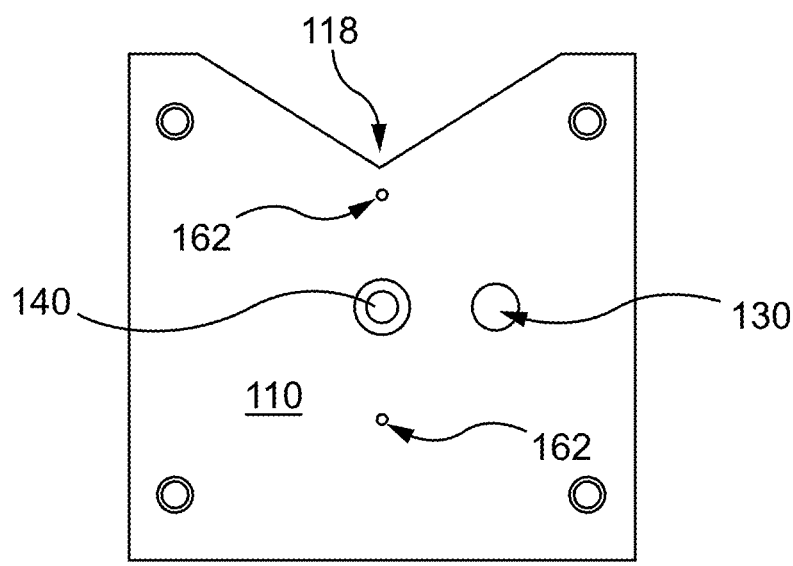
Figure 6C:
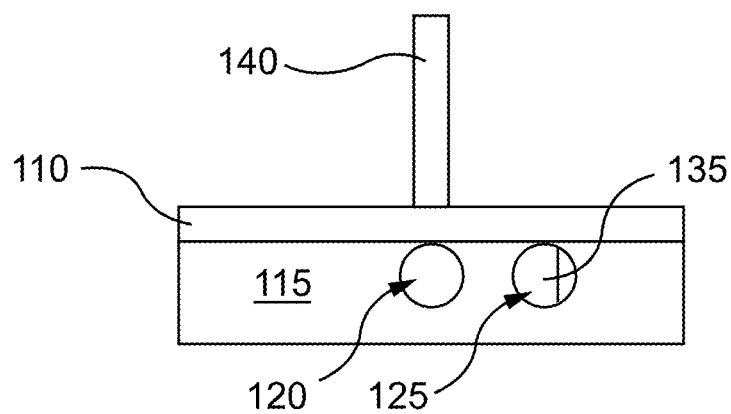
Figure 6D:
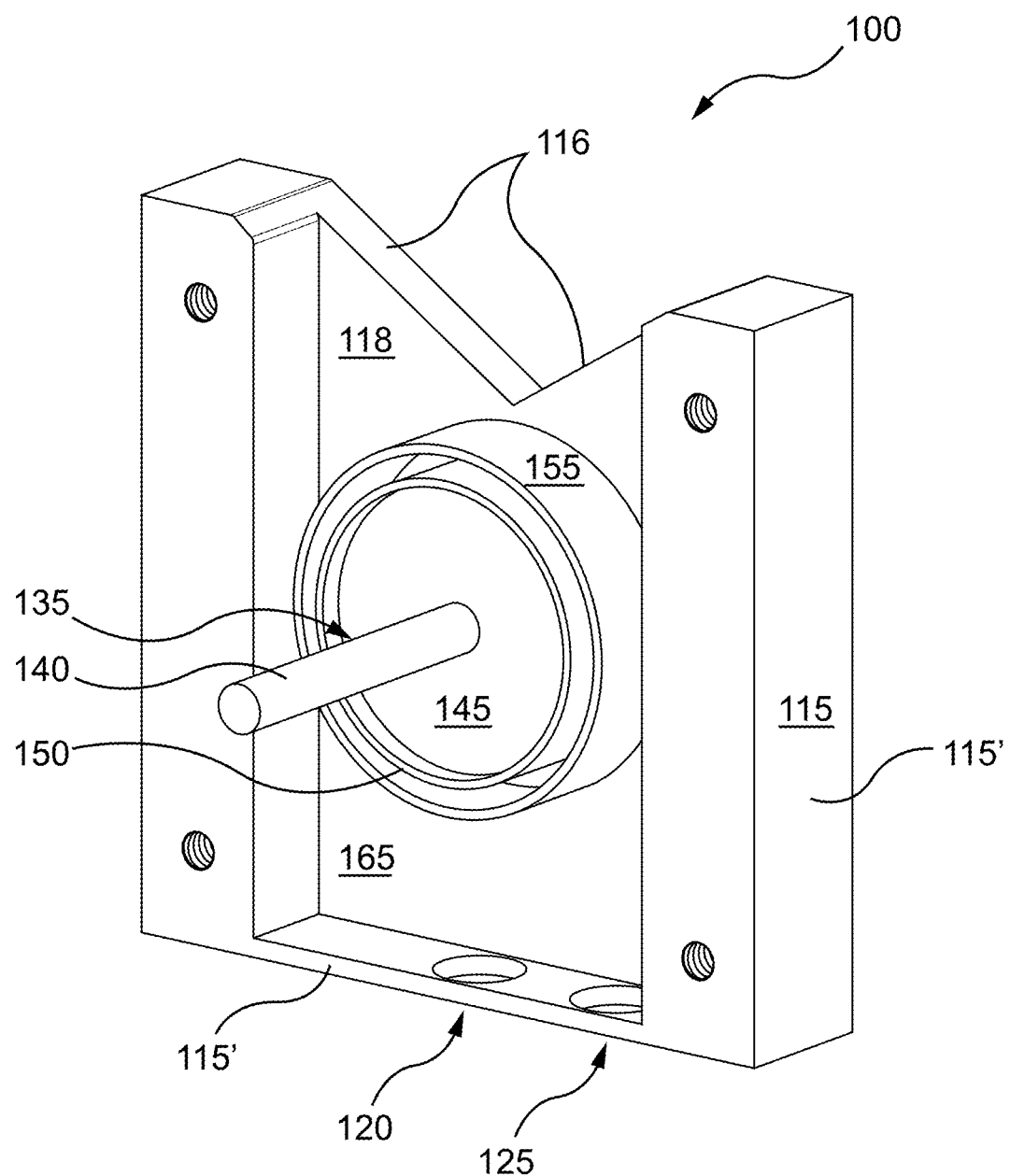

For rheological analysis of the sample material in the 1-2 shear plane, the sample-cell member is then repositioned to the XYZ linear position as shown in FIG. 5B. However, in this position, rheological analysis could not be done previously because the orientation required to measure oscillatory displacement of the rheometer shaft was misaligned in relation to the cell geometry. Thus, a right-angle gear drive was developed to transfer the rotational output stress from the rheometer shaft to the cell geometry and, at the same time, transfer oscillatory displacement information from the cell geometry to the rheometer. The right-angle gear drive is generally comprised of a housing containing two drive shafts oriented at 90 degrees to each other. These shafts are typically supported by one or more bearings or bushings each. The shafts contact through right-angle gearing, which can be in the form of bevel gears, worm gears, or helical gears. In some embodiments, a magnetic worm-gear drive may be incorporated into the right-angle gear drive.

As depicted in FIG. 5B, the sample-cell member 1 is oriented in the XYZ linear position such that cell geometry shaft 35 is in a lateral, or horizontal, orientation and attached to the lateral portion 88 of right-angle gear drive 85 with a coupler 90. The rheometer shaft 65 is then attached to the vertical portion 87 of the right-angle gear drive 85 with a coupler 90. In some embodiments, a collet chuck can be used instead of the coupler 90. As the rheometer shaft 65 rotates, the right-angle gear drive 85 translates this rotational movement to the cell geometry shaft 35 which, in turn, rotates the cell geometry 30 to apply rotational stress to the sample material 5. In the orientation shown in FIG. 5B, rheological measurements can be recorded while a radiation beam is applied to the sample material 5 for imaging analysis of the 1-2 radiation scattering plane.

In the XYZ orientation, however, previous sample cell designs did not provide for accurate rheological measurements because extra torque was bearing on the shaft of the device. While not intending to be bound by theory, the cause of this deficiency was two-fold. First, the material sample on the top and bottom of the shaft of the cell geometry in this orientation potentially creates a secondary material flow that generates extra torque on the shaft. Second, previous concentric cylinder designs included bushes and bearings that potentially created friction while contacting the cell geometry shaft.

To alleviate these deficiencies, the present sample-cell member 1 was designed with a cell geometry design that includes a cylinder 40 with an upper circumferential lip 46 and a lower circumferential lip 48 that corresponds to an upper circumferential groove 50 in the cover 10 of the sample-cell member 1 and a lower circumferential groove 55 in the base 15 of the cell member 1, respectively (see FIGS. 4 and 5). In some embodiments, the upper circumferential groove 50 and lower circumferential groove 55 are machined into the cover 10 and base 15, respectively. In yet other embodiments, a sealing member 57 is disposed within one or more of the grooves to prevent direct contact of the components and leakage of the sample material. This novel design in combination with other design achievements described below results in a free rotation and minimal to no-contact movement between the cell geometry 30 within the grooves 50, 55 of the sample-cell member 1 to reduce mechanical friction. Moreover, a small space 37 between the cell geometry 30 and the bore surface of the cover 10 enables rotation of the cell geometry 30 without making contact with the cover 10. The rigid coupling between the right-angle gear drive 85 and the shaft 35 of the cell geometry 30 maintain the small space 37 and no-contact rotation even with the sample cell 1 is in the XYZ linear orientation.

Another issue with previous designs was a tendency for leakage of the sample material when the sample cell was in the XYZ linear orientation. To solve this problem, the sample-cell member provided herein includes a coating, such as a hydrophobic coating, applied to the inner surfaces of the cell member and cell geometry to maintain the sample material in the desired geometry by capillary forces. The coating is shown by the dotted lines in FIGS. 5A and 5B. The implementation of the coating in combination with the free rotation lip and groove design of the cell member removes the need for any bearings or bushings that cause increased friction and alleviates excess torque from the cell geometry shaft. In particular embodiments, a hydrophobic coating is used. Suitable hydrophobic coatings include, but are not limited to silicone, a combination polytetrafluoroethylene/silicone lubricant, polytetrafluoroethylene, "lotus-leaf" inspired superhydrophobic coatings, nanoparticle coatings, oleophilic polymers (e.g., polyethylene and polypropylene), rubbers, oils, and hydrocarbon greases. The coatings may be applied or chemically or thermally grafted onto the surface. Suitable hydrophobic coatings are also commercially available, such as TEFLON (DuPont de Nemours, Inc. Delaware, USA), TEFLON silicone lubricant (DuPont de Nemours, Inc., Delaware, USA), silicon-based Aculon lubricant (Aculon, Inc., California, USA and as described in U.S. Pat. No. 9,725,619), and NANOMYTE SuperCN Plus (NIE Corporation, New Jersey, USA). Alternatively, hydrophilic coatings can be used for use with oleophilic sample materials. Suitable hydrophilic coatings include, but are not limited to polyethyleneoxide (PEO), amides, polyimides, polyvinylpyrrolidone (PVP), polyvinyl alcohol (PVA), polyurethanes, polyacrylic acid (PAA), polysaccharides, Pluronic block copolymers, and biopolymers. Thus, the combination of the coating and the lip and groove design creates a no-contact, free-floating "bob" concentric cylinder cell geometry with reduced friction and torque contamination, but without leakage of the sample material even when the sample cell is in the XYZ linear orientation.

Figure 7A:
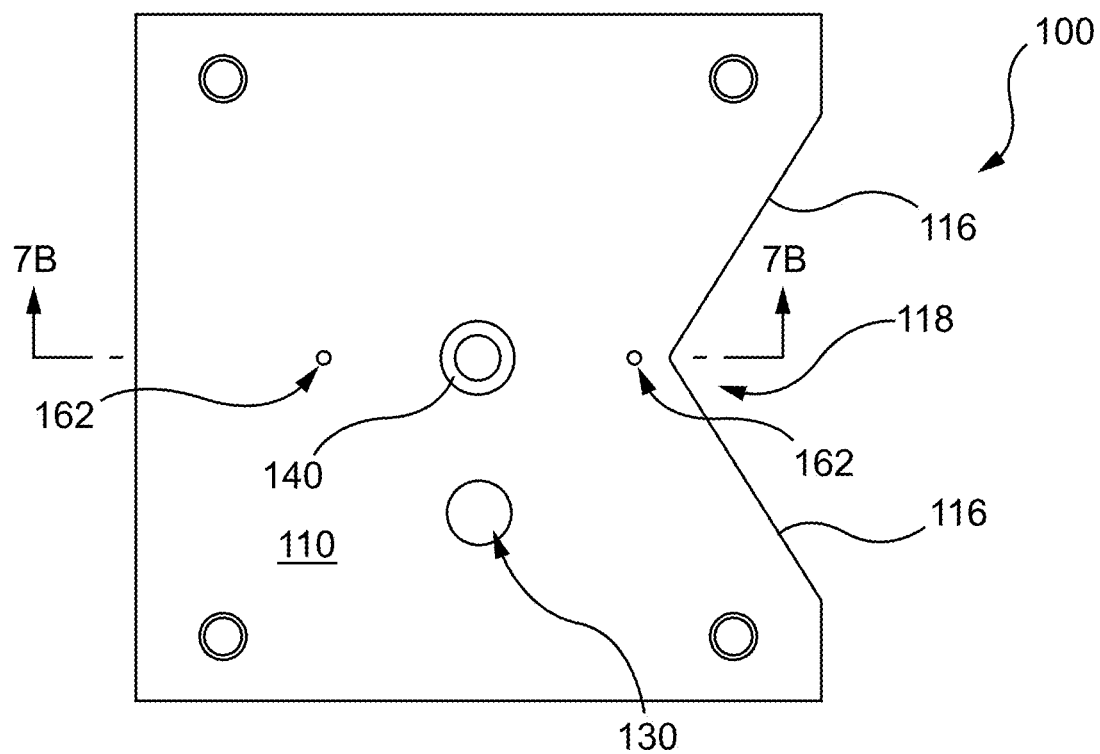
FIGS. 7A and 7B depict an exemplary embodiment of a sample-cell member showing the top view (FIG. 7A) and the cross-sectional view (FIG. 7B). The dotted line represents the hydrophobic coating on the inner surfaces of the sample-cell member.
Figure 7B:
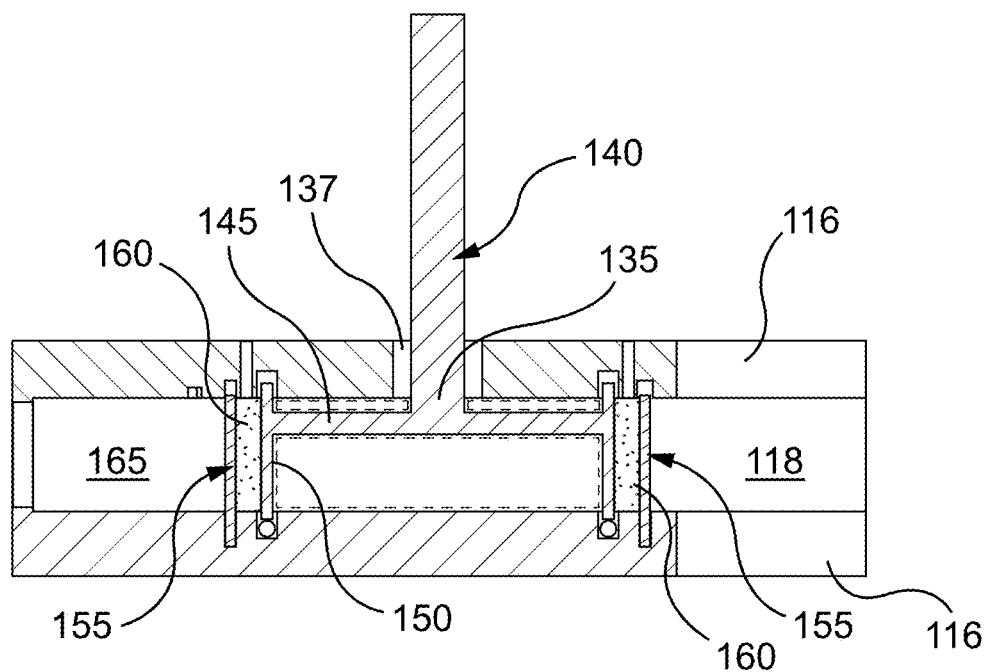

FIGS. 6 and 7 depict another embodiment of the sample-cell member that is open in the back of the cell to eliminate any unnecessary material in the path of the radiation. Additionally, this embodiment includes windows for providing a pathway for the radiation beams as well as sample loading ports that enable the user to load the sample material without disassembling the sample-cell member. As shown in FIGS. 6A-D, the exemplary sample-cell member 100 includes a cover 110 and base 115 with sidewalls 115'. Similar to the embodiment described above, sample-cell member 100 includes a cylindrical barrier wall 155 concentric with the cylinder 150 of the cell geometry 135 (see FIG. 6D). This particular embodiment includes an opening 118 in the back of the cell (see also FIG. 6D and FIG. 7B). The opening 118 can be accompanied by angled cut-away portions 116 in both the cover 110 and base 115 to alleviate any sample cell material in the scatting path of the deflected radiation. In a preferred embodiment, the sample-cell member includes cut-away portions with angles of about 58 degrees relative to the beam direction, or about 116 degrees for the entire opening. Notably, despite the opening 118, the sample material is contained in the space between the cylindrical barrier wall 155 and the cylinder 150 of the cell geometry 135 thereby preventing leakage of the sample material into the inner compartment 165.

The front sidewall 115' of the base 115 may also include a radiation beam window 120 to receive the incident radiation beam for 1-3 radiation scattering plane imaging and a second radiation beam window 125 to receive the incident radiation beam for 2-3 radiation scattering plane imaging. Likewise, the sample-cell member 100 includes a radiation beam window 130 in the cover 110 to receive the incident radiation beam for 1-2 radiation scattering plane analysis. As noted above, the radiation beam windows 120, 125, 130 provide a pathway for the radiation beam and additionally provide transparency for visualizing the sample material. Suitable material for the windows 120, 125, 130 for use with neutron radiation include thin-walled titanium, aluminum, or beryllium-quartz. Preferably, the windows comprise beryllium-quartz to additionally enable visual inspection of the sample material. For use with X-rays as a radiation source, the polymer 4,4'-oxydiphenylene-pyromellitimide (e.g., Kapton™) is the preferred embodiment for the windows. For use with visible light as a radiation source, an optically transparent window, such as glass or quartz, are the preferred embodiments. For optical wavelengths in the UV and IR, windows comprised of magnesium fluoride, barium fluoride, calcium fluoride, sodium chloride, potassium chloride, zinc, sulfide, zinc selenide, silicon, germanium, diamond, sapphire, or fused silica may be used.

Finally, the sample-cell member 100 includes one or more sample loading ports 162 in the cover 110 to enable the user to load the samples, e.g., connecting syringes containing the sample material to the loading ports 162, without disassembly of the sample-cell member 100. As shown in FIG. 7B, the cell geometry 135 is similar to that described above and includes a cylinder 150 connected to the shaft 140 by a lateral wall 145. The sample material 160 is disposed within the space between the cylinder 150 and the cylindrical barrier wall 155. The shaft 140 of the cell geometry 135 attaches to the rheometer in the same was as described above. A hydrophobic coating is applied to the inner surfaces of the sample-cell member as described elsewhere above. Thus, the combination of the coating and the lip and groove design creates a no-contact, free-floating "bob" concentric cylinder cell geometry with reduced friction and torque contamination, but without leakage of the sample material even when the sample cell is in the XYZ linear orientation.

In some alternative embodiments, it may be desirable to measure sample materials with high viscosity (e.g., more than about 5,000 mPa·s). As the skilled artisan will appreciate, highly viscous materials will not shear as easily in response to the rotational stress applied by the cylindrical cell geometry. While some alternative cell geometries discussed above may be used for such high viscosity high-viscosity sample materials (i.e., parallel plates), the concentric cylinder cell geometry can be modified by sandblasting or other similar techniques to mitigate wall slip, which is often a problem for shearing high viscosity high-viscosity sample materials. Additionally, the gap between the cell geometry cylinder and the circumferential barrier wall can be widened to allow for more viscous sample materials. In yet other embodiments, the sample material is heated prior to loading into the sample-cell member and then cooled just prior to analysis.

Sample Cell Support Assembly and 4D-Rheo SAS Sample Environment

Figure 8A:
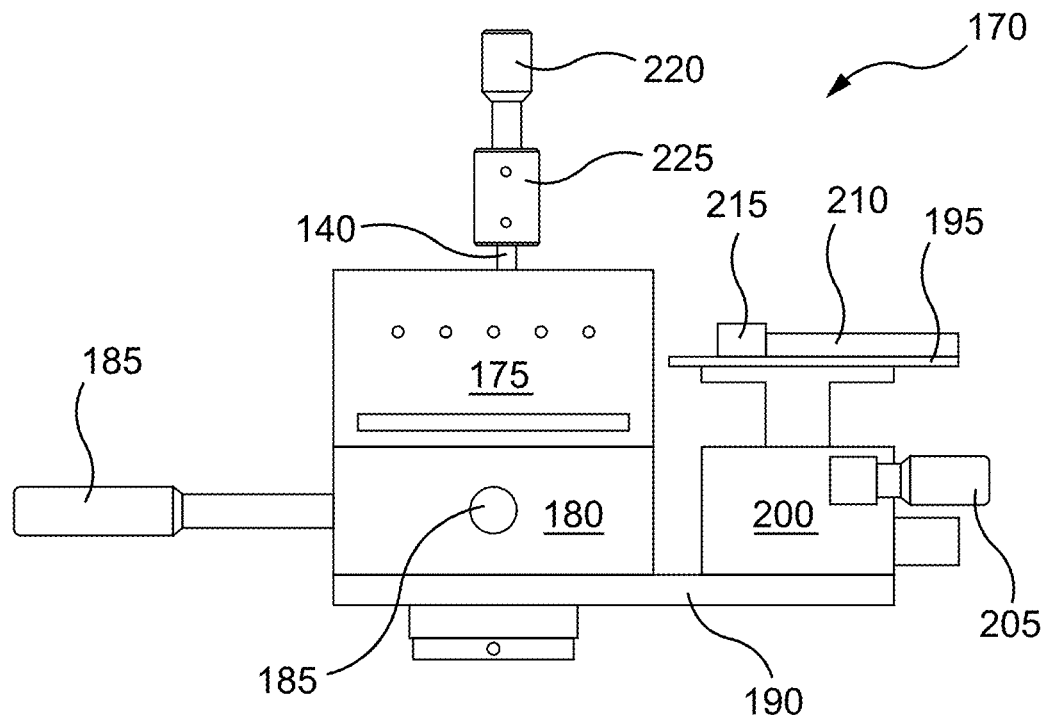
FIGS. 8A and 8B are diagrams of an exemplary sample-cell member and cell support assembly shown in the side view (FIG. 8A) and front perspective view (FIG. 8B). The sample-cell member is shown in the XY position (1-3, 2-3 shear plane). The dotted arrows represent radiation beams.
Figure 8B:
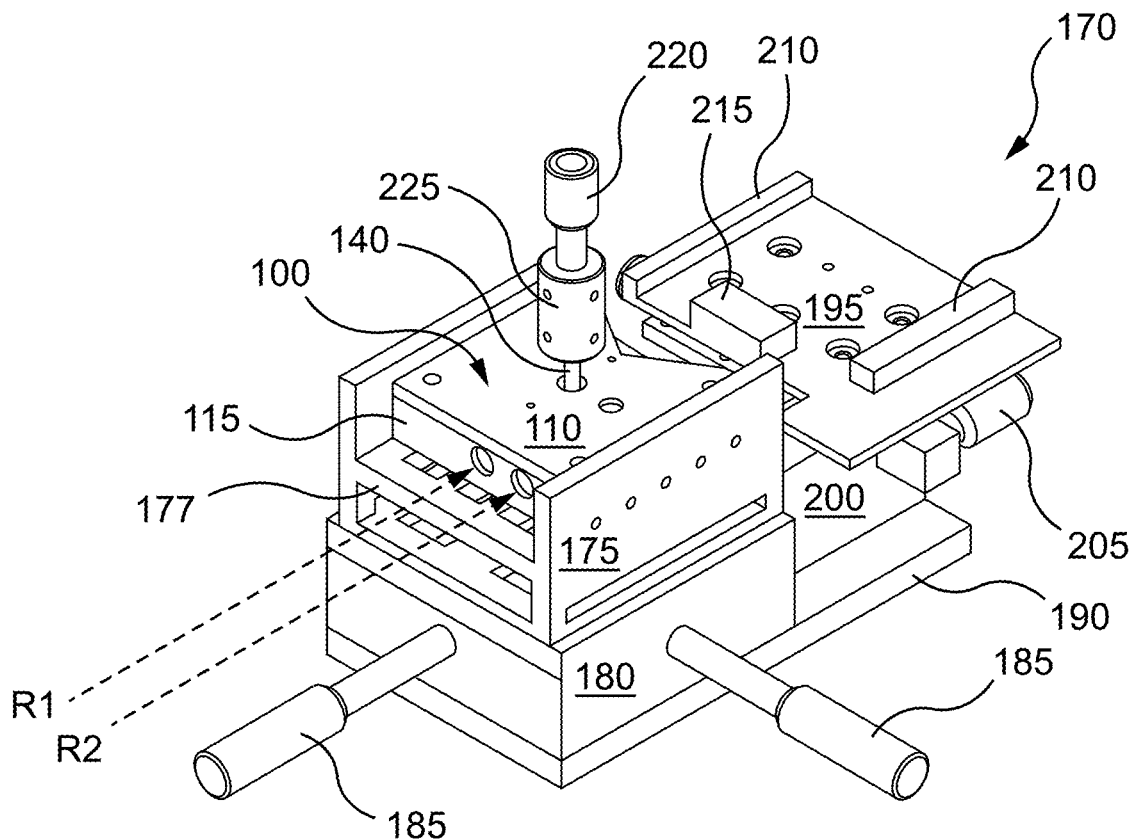

In order to properly align the sample material with the incident radiation beam while collecting rheological measurements, a specially designed sample support assembly is provided herein to support the sample-cell member in both the XY linear orientation as well as the XYZ linear orientation. Shown in FIGS. 8A and 8B is a sample support assembly 170 with the sample-cell member 100 in the XY linear position. The sample support assembly 170 includes a stage support member 190 for supporting both the XY stage 180 and the XYZ stage 200. The sample-cell member 100 is disposed on the shelf 117 of the XY cell support member 175 that is, in turn, disposed on the XY stage 180. The XY stage 180 includes one or more stage adjustment knobs 185 so that the user can align the sample-cell member 100 to receive an incident radiation beam (R1) for 1-3 scattering plane imaging or an incident radiation beam (R2) for 2-3 scattering plane imaging. When the sample-cell member 100 is the XY linear orientation, the cell geometry shaft 140 is attached to the rheometer shaft 220 with a coupler 225. In some embodiments, the coupler 225 is replaced with a collet chuck, such as, but not limited to a double ended double-ended collet chuck. This allows for simultaneous rheological measurements to be taken in the 1-3, 2-3 shear plane.

Figure 9A:
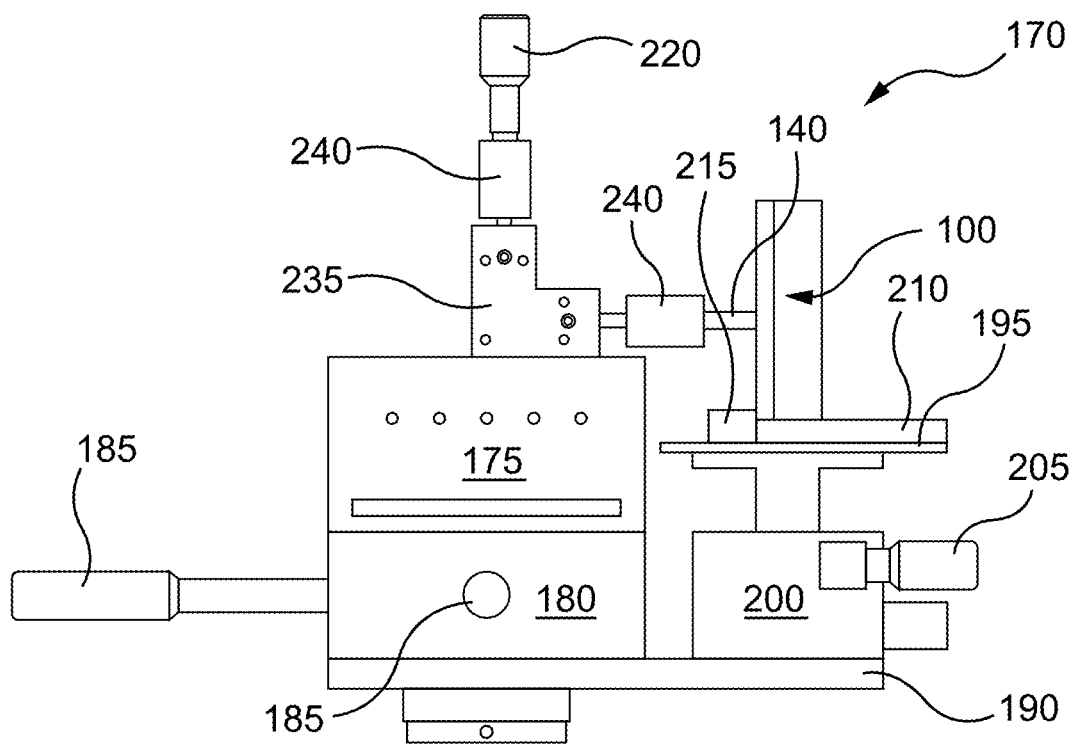
FIGS. 9A and 9B are diagrams of an exemplary sample-cell member and cell support assembly shown in the side view (FIG. 9A) and front perspective view (FIG. 9B). The sample-cell member is shown in the XYZ position (1-2 shear plane). The dotted arrow represents a radiation beam.
Figure 9B:
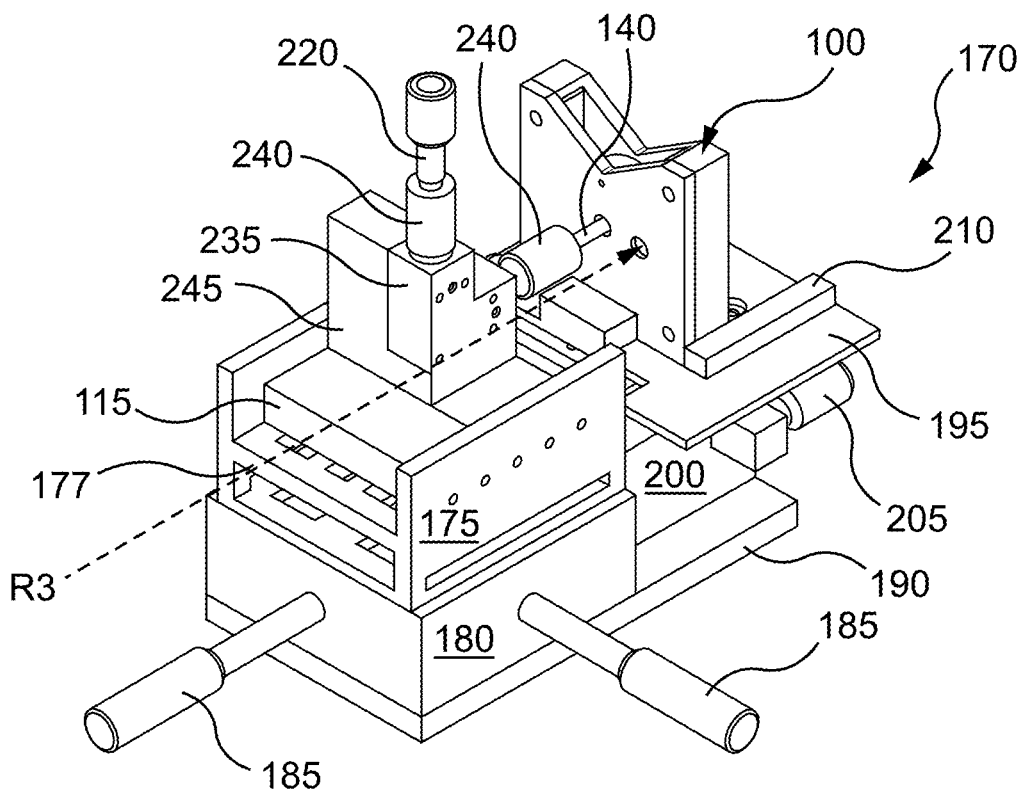

For imaging in the 1-2 scattering plane, the sample-cell member 100 is decoupled from the rheometer shaft 220 and the coupler 225 is removed. As depicted in FIGS. 9A and 9B, the sample-cell member 100 is rotated horizontally to the XYZ linear orientation and placed on the to the XYZ cell support member 195. The coupler 225 is replaced by a right-angle gear drive 235, which is then coupled to both the rheometer shaft 220 and the cell geometry shaft 140 with couplers 240. In some embodiments, the couplers 240 are replaced with collet chucks, such as, but not limited to, double-ended collet chucks. As shown in FIG. 9A, the sample-cell member 100 is disposed on the XYZ cell support member 195 between the lateral guides 210 and front guide 215. Alternatively, the forward guide 215 can be a spring-loaded guide plunger to secure the sample-cell member 100. The XYZ cell support member 195 is disposed on the XYZ stage 200, which contains one or more stage adjustment knobs 205. The position of the sample-cell member 100 can be adjusted by the stage adjustment knobs 205 to ensure alignment with the radiation beam (R3) for 1-2 scattering plane imaging. In particular, the adjustment knobs 205 of the XYZ stage 200 allow for the adjustment of the geometry gap within the cell assembly as a manual process for zero gapping. In this position, the cell geometry shaft 140 is rigidly coupled to the right-angle gear drive 235 with a coupler 240. Likewise, the right-angle gear drive 235 is attached to the rheometer shaft 220 with a coupler 240. In some embodiments, an extra gear support 245 can be provided to stabilize the right-angle gear drive 235. This design allows easy rotation of the sample-cell member between the 1-3, 2-3 shear plane and the 1-2 shear plane without removing the sample from the device and without the need to rearrange the radiation beam source or rheometer. As such, the right-angle gear drive permits rheological measurements to be taken in the 1-2 shear plane simultaneously with the 1-2 scattering plane imaging.

Figure 10:
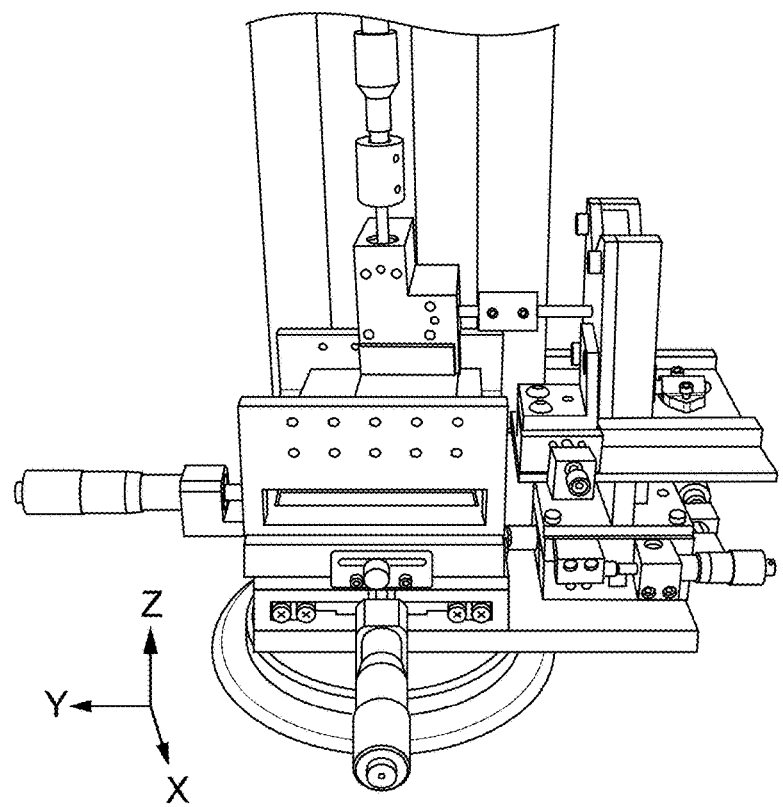
FIG. 10 is a photograph of an exemplary sample-cell member and support assembly in the 1-2 shear plane configuration. The x-, y-, and z-axes are shown by the arrows.
Figure 11:
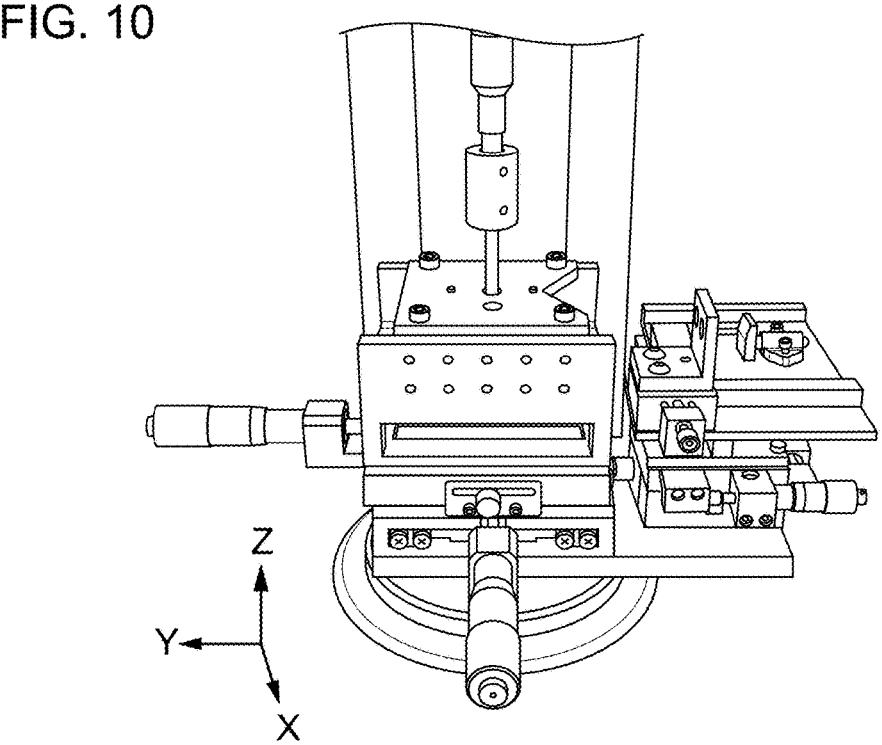
FIG. 11 is a photograph of an exemplary sample-cell member and support assembly in the 1-3, 2-3 shear plane configuration. The x-, y-, and z-axes are shown by the arrows.

FIGS. 10 and 11 are photographs illustrating the sample-cell member and support assembly set up. FIG. 10 shows the sample-cell member and support assembly in the 1-2 shear plane configuration. As shown in FIG. 10, the right-angle gear drive is aligned by placing the right-angle gear drive assembly onto the XY cell support base. The rheometer head is lowered so that the rheometer plate and shaft of the right-angle gear drive are less than about 5 mm apart. Zero gapping is then performed as described elsewhere herein. The head of the rheometer is then lifted, and the right shaft coupling is installed. The shaft of the right-angle gear drive is aligned using the adjustment knobs on the XY linear stage. The adjustment knobs are then locked. In this configuration, the rigid shaft coupling should be able to slide up and down the two shafts with ease. Once aligned and flushed with the rheometer plate, the rigid shaft coupling is tightened. The gap is set to 5 μm and the rigid shaft coupling is then tightened to the shaft of the right-angle gear drive.

For the 1-3, 2-3 shear plane configuration, the sample cell is placed in the XY cell support base as shown in FIG. 11. The rheometer head is lowered so that the plate of the rheometer head and the shaft of the cell geometry are less than 5 mm apart. Zero gapping is then performed. The rheometer head is the lifted to install the rigid shaft coupling. The shaft of the cell geometry is aligned using the adjustment knobs on the XY linear stage. The adjustment knobs are then locked, and the rigid shaft coupling should be slidable along the two shafts to indicate proper alignment. Once aligned, the rigid shaft coupling is tightened to the 8 mm plate. The gap is set to 5 μm, and the rigid shaft coupling is tightened to the shaft of the cell geometry. If the user desires, a simple peak hold protocol may be run to ensure the cell geometry is properly aligned.

Figure 12:
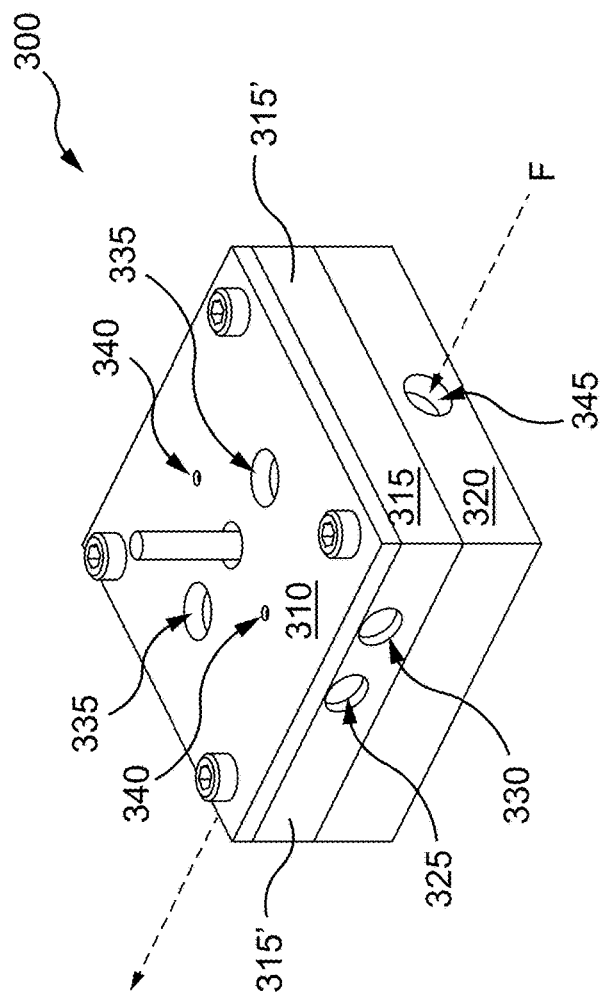
FIG. 12 depicts an exemplary embodiment of a sample-cell member and heat exchange block.

FIG. 12 depicts another embodiment of a sample-cell member 300 that incorporates a temperature control system for the sample environment, and can be incorporated into the cell support assembly described herein. In particular, a heat exchanger can be used for temperature control. The sample-cell member 300 includes a cover 310 and base 315 with a sidewall 315' that comprises a radiation beam window 325 for receiving an incident radiation beam for 1-3 scattering plane imaging and a radiation beam window 330 for receiving an incident radiation beam for 2-3 scattering plane imaging. The cover 310 includes at least one radiation beam window 335 for receiving an incident radiation beam for 1-2 scattering plane imaging. Further, the cover 310 includes sample loading ports 340. In this embodiment, the sample-cell member 300 is disposed on a heat exchange block 320 that allows heat exchange fluid F to flow through opening 345 to facilitate heat transfer. The heat transfer fluid F is circulated through the tubing in the heat exchange block 320 in order to heat or cool the sample within the sample-cell member 300. In some embodiments, a thermocouple can be integrated to permit monitoring and automatic control of the sample-cell member temperature through the radiation beamline control systems interfacing with the rheometer firmware. The inclusion of a heat exchanger component enables accurate and precise temperature control of the sample-cell member. In some embodiments, the desired temperature is selected from a temperature range from about −35° C. to about 150° C.; preferably, the temperature range is from about 5° C. to about 80° C. In some embodiments, the temperature of the sample-cell member is maintained within about 1° C. of the desired temperature set point. In preferred embodiments, the temperature of the sample-cell member is maintained within about 0.1° C. of the desired temperature set point. Further, the heat exchange fluid F can be circulated through the system with any art-standard fluid circulator, such as the JULABO FP35-HL circulator (Julabo USA, Inc., Pennsylvania, USA). For instance, the JULABO FP35-HL circulator provides for a working temperature range from about −35° C. to about 150° C. with a pump capacity flow pressure of about 5.8 psi to about 10.2 psi and a pump capacity flow suction of about 2.9 psi to about 5.8 psi.

Figure 13:
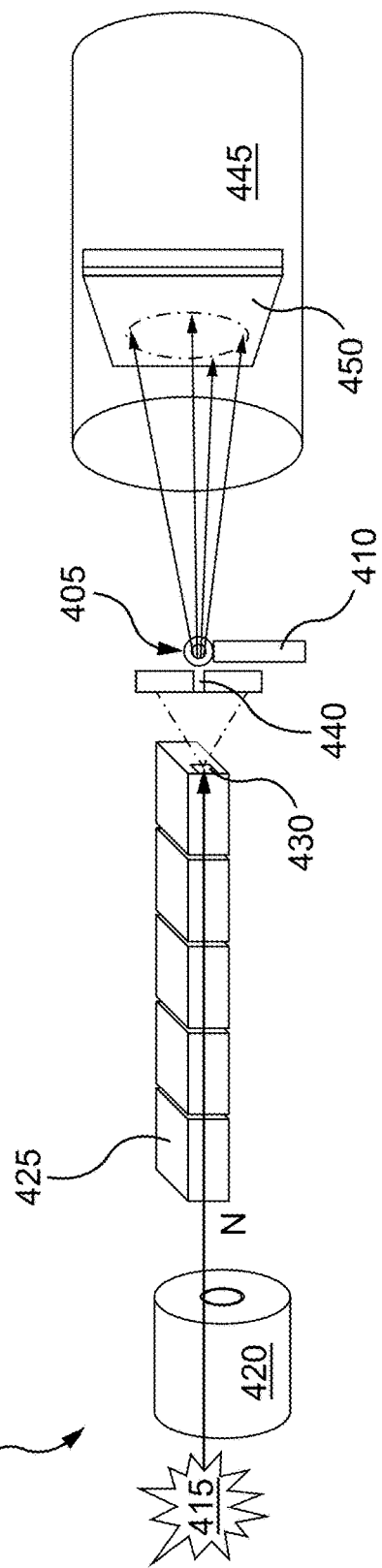
FIG. 13 is a diagram of a 4D-rheo SANS environment.

The sample-cell member and support assemblies described herein can be used to create a 4D-SAS sample analysis environment, such as a SANS or SAXS sample environment, that allows simultaneous rheological measurements to be taken in the 1-3, 2-3 and 1-2 shear planes to provide highly relevant information regarding the structure/property relationships of Theologically complex materials. FIG. 13 is a diagrammatical representation of an exemplary 4D-SANS environment 400. SANS is a technique that is well within the purview of the skilled artisan and will only be described generally herein. Briefly, the sample environment 405, which includes a sample-cell member, sample support assembly, and rheometer as described above, is placed upon a support platform 410 at a distance and position suitable for receiving a beam of radiation for SANS imaging. A horizontal cold source 415 and a velocity selector 420 produce a neutron beam N that passes through a collimation system 425. As the beam passes through the diaphragm 430 it is focused on the sample 405 by the aperture 440. The neutron beam N is scattered as it passes through the sample and is imaged I on a detector 450 disposed within an evacuated tube 445.

In preferred embodiments, the neutron beam is created by accelerating hydrogen isotopes, e.g., deuterium, tritium, or a mixture of deuterium and tritium. In one particular embodiment, the neutron beamline is produced by a neutron velocity selector with a rotation speed of between about 2,800 rpm and about 28,300 rpm and a tilt angle of about −10 degrees to about 10 degrees. Finally, the scattering of the neutron radiation can be detected using any art-standard means, such as an 3He multidetector.

REFERENCE NUMBERS

1—sample-cell member
5—sample material
10—cover
15—base
15'—side wall of base
20—inner compartment
25—cylindrical barrier wall
30—cell geometry
35—shaft
40—cylinder
42—cylinder sidewall
44—lateral wall
46—upper circumferential lip
48—lower circumferential lip
50—upper circumferential groove
55—lower circumferential groove
57—sealing member
60—Rheometer
65—Rheometer shaft
70—coupler
75—drag cup motor
80—displacement sensor
85—right-angle gear drive
87—vertical portion
88—horizontal portion
90—coupler
100—sample-cell member
110—cover
115—base
115'—sidewall
116—angled cut-away portions
118—opening
120—radiation beam window (1-3 plane)
125—radiation beam window (2-3 plane)
130—radiation beam window (1-2 plane)
135—cell geometry
140—cell geometry shaft
145—lateral wall
150—cylinder
155—cylindrical barrier wall
160—sample material
162—sample loading ports
165—inner compartment
170—sample support assembly
175—XY cell support member
177—shelf
180—XY stage
185—stage adjustment knobs
190—stage support member
195—XYZ cell support member
200—XYZ stage
205—stage adjustment knobs
210—guides
215—guide/spring-loaded guide plunger
220—rheometer shaft
225—coupler
235—right-angle gear drive
240—coupler
245—gear support
300—sample-cell member
310—cover
315—base
315'—sidewall
320—heat exchange block
325—radiation beam window (1-3 plane)
330—radiation beam window (2-3 plane)
335—radiation beam window (1-2 plane)
340—sample loading port
345—tube opening
400—4D-SANS environment
405—sample
410—stand/platform
415—horizontal cold source
420—velocity selector
425—collimation system
430—diaphragm
440—aperture
445—evacuated tube
450—detector The following examples are provided to describe the invention in greater detail. They are intended to illustrate, not to limit, the invention.

EXAMPLES

Example 1. Materials and Methods

Test Samples

Xanthan gum (purity ≥99.5%; Sigma-Aldrich Corporation, Missouri, USA) and glycerol (purity ≥99.5%; Sigma-Aldrich Corporation, Missouri, USA) were used as sample materials to evaluate the devices described herein in a 4D-Rheo SANS environment. The xanthan molecule forms a microstructure by physical interactions and is widely used as a thickener in food industries and as a blood simulant in research. Glycerol was used as a reference Newtonian fluid and has a linear stress response when subjected to shear. Xanthan gum was dissolved in deionized water (resistivity 18.2M (2·cm) to form a 1 wt. % solution. The fluid properties of xanthan gum and glycerol are summarized in Table 1.

TABLE 1

Glycerol and xanthan gum fluid properties.

|  | Glycerol | Xanthan Gum |
|---|---|---|
| Properties | Newtonian | 1 wt % in Water-Non-Newtonian |
| Chemical formula | $C_3H_8O_3$ | $C_{35}H_{49}O_{29}$ (monomer) |
| Molar mass | 92.09 Da | 4.5-6 MDa |
| Density (kg/m$^3$) | 1260.8 | 1003.2 |

Kg, kilogram
M3, cubic meters
Da, Daltons
MDa, megadaltons

Sample Cell

The exemplary sample cell as described in FIGS. 3-5 was used for the evaluation in combination with the sample support assembly depicted in FIGS. 8 and 9. However, the exemplary sample cell described in FIGS. 6 and 7 could have been used as well. In these studies, while the exemplary sample cell was tested in the 4D-Rheo SANS environment, only rheological measurements were taken to test the functionality of the cell geometry in the sample cell with the hydrophobic coating as well as the right-angle gear drive when the exemplary cell was in the 1-2 shear plane (i.e., the XYZ position).

To prepare the surfaces for the hydrophobic coating, all surfaces of the sample cell were cleaned using ethanol to remove any dust or residue that may have been present prior to application. To apply the hydrophobic coating, a TEFLON silicone lubricant (DuPont de Nemours, Inc., Delaware, USA) was then sprayed onto the surfaces. After spraying, the liquid film was dried overnight. Finally, the excess was removed, and the coating was gently dried with an air flow.

The sample cell specifications are summarized in Table 2.

TABLE 2

Sample Cell Specifications.

| Maximum shear rate (s$^{-1}$) | 5565 |
|---|---|
| Maximum stress (Pa) | 12262.7 |
| Minimum stress (Pa) | 3.06 × 10$^{-4}$ |
| Frequency (Hz) | 0-10* |
| Strain | 0.32-35* |

Pa, pascal
Hz, hertz

Rheological Testing Methods

A stress-controlled DHR rotational rheometer (TA Instruments, Delaware, USA) and a strain-controlled ARES-G2 rotation rheometer (TA Instruments, Delaware, USA) were used for the rheological measurements. The exemplary sample cell was used with the DHR rotational rheometer and the measurements were compared to the ARES-G2 rotational rheometer equipped with the cone-and-plate geometry accessory. The minimum torques measurable in steady shear was 5 nN·m and 0.5 nN·m in oscillation for the DHR rotational rheometer and 100 nN·m and 50 nN·m in oscillation for the ARES-G2 rotation rheometer. To convert the measured torque and rotational velocity to shear stress and shear rate for the exemplary sample cell on the DHR rotational rheometer, the stress constant (61313.4 Pa·(N·m)$^{-1}$) and the strain constant (18.55 rad-1) were used. A cone-and-plate geometry (40 mm and 0.0199 rad) was used with the ARES-G2 rotational rheometer, for which the stress constant was 59683.1 Pa·(N·m)$^{-1}$ and the strain constant was 50.25 rad-1. The sample materials were tested using four testing methods (i.e., peak hold, oscillation, flow startup, and flow stop) in order to investigate the capability of the exemplary sample cell.

Peak Hold Flow Sweep

Figure 14A:
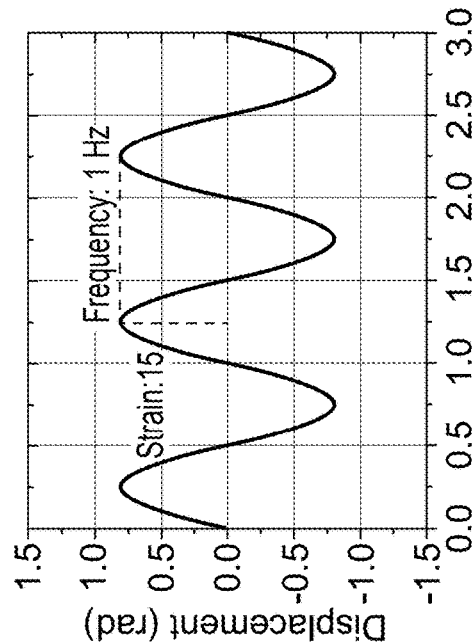
FIGS. 14A-14D are schematics of the rheological testing methods.

Multiple peak holds in various rotational velocities were used to represent the steady shear flow sweep method. The observed fluctuation in the measured torque while the shaft was rotating suggested there were certain areas containing unexpected friction. Therefore, to minimize the fluctuation, several full revolutions were programmed to have averaged identical history with a series of rotational velocities as shown in FIG. 14A. Summarized in Table 3 are the testing parameters of peak hold flow sweep used in averaging the torque values for baseline cell data. The empty cell data was averaged and used to normalize the sample data after performing the same test procedure. Such rotational mapping is a standard aspect of rheological testing, and indeed was a built-in feature of commercial rheometer software.

Figure 15A:
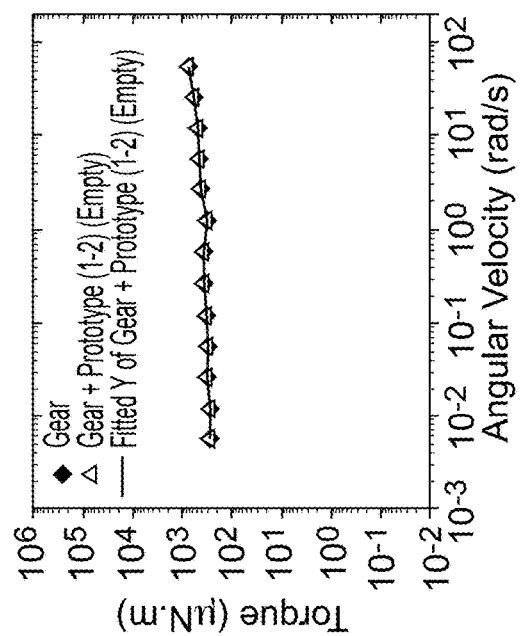
FIGS. 15A and 15B are graphs measuring torque values for an empty sample-cell member (no sample material). The testing was done with the empty cell in the 1-3, 2-3 shear plane (FIG. 15A) as compared to the 1-2 shear plane (FIG. 15B). The results revealed low torque values in the 1-3, 2-3 shear plane as compared to the 1-2 shear plane (FIG. 15A compared to FIG. 15B). Smoothing of 1-2 shear plane data was performed by fitting a 2nd order polynomial equation to the peak hold values. This was used as baseline data to normalize sample testing results. The y-axis represents torque, and the x-axis represents angular velocity.
Figure 15B:
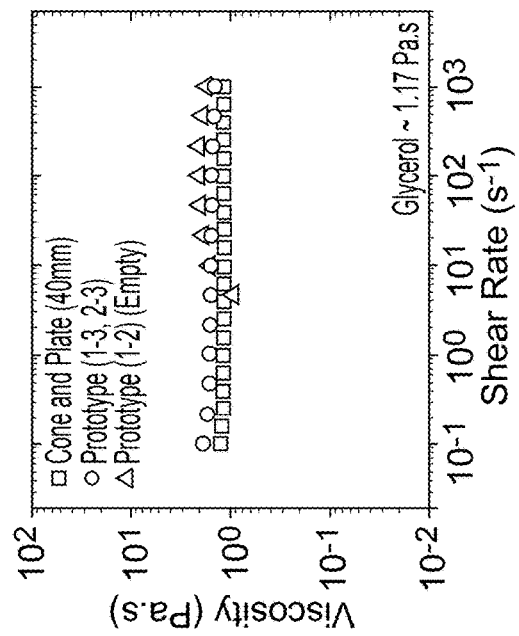

To calculate the true mechanical response from the testing fluids, the friction from the empty cell was calibrated. Hence, an identical procedure was performed using the empty cell. Then, the data for each velocity were averaged and fitted to a 2nd order polynomial as shown in FIG. 15A for 1-3 and 2-3 shear planes and FIG. 15B for 1-2 scattering plane. In this regard, the measured torque in the presence of testing fluids was found by the same curve-fitting procedure, and the calibrated signal from the empty cell was subtracted to find the true response of the testing fluid net of any cell torque.

TABLE 3

Testing parameters of peak hold flow sweep.

| Angular Velocity (rad/s) | Shear Rate (s$^{-1}$) | No. of Full Rotations |
|---|---|---|
| 54.70 | 1014.64 | 40 |
| 25.39 | 470.99 | 20 |
| 11.79 | 218.67 | 10 |
| 5.47 | 101.51 | 5 |
| 2.54 | 47.14 | 3 |
| 1.18 | 21.88 | 2 |
| 0.55 | 10.15 | 1 |
| 0.25 | 4.71 | 1 |
| 0.12 | 2.19 | 1 |
| 0.05 | 1.02 | 1 |
| 0.03 | 0.47 | 1 |
| 0.01 | 0.22 | 1 |
| 0.01 | 0.10 | 1 |

Rad/s, radian per second

Oscillation

Figure 14B:
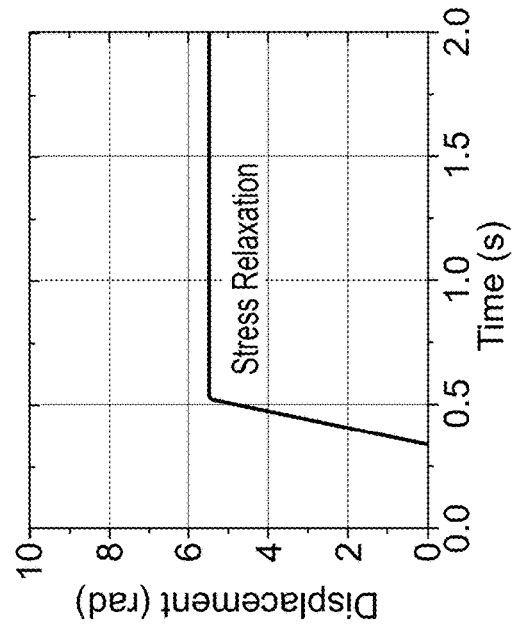

Oscillation tests were performed using a series of strain amplitudes to locate the accessible operating window of the exemplary sample cell. This testing is particularly relevant for 1-2 shear plane with the gear drive due to the small amount of backlash inherent in the right-angle gear drive. An encoder was mounted to measure the oscillatory displacement of the output shaft. The encoder output was compared to a theoretical input wave to determine the phase-shift or other deviation of the real drive output from the ideal waveform (see FIG. 14B). Based on the operating window, a strain of 15 (large amplitude oscillatory shear, LAOS) was chosen to conduct the oscillation tests in the 1-2 shear plane in the presence of the testing fluids. When calculating the true sample response, the oscillatory torque was calibrated by removing the torque from the identical procedure using the empty cell. For the 1-3 and 2-3 shear planes, the oscillatory results were obtained with strain 0.276 (small amplitude oscillatory shear, SAOS), as the empty cell friction was significantly lower for the empty cell used to test these planes (no right-angle gear drive).

Flow Startup Stop

Figure 14C:
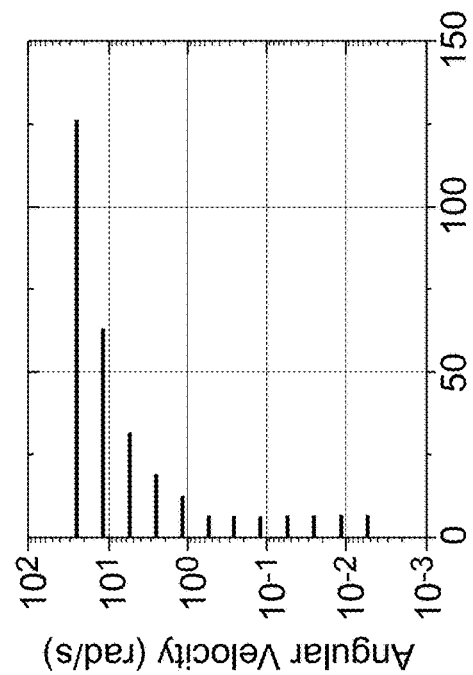
Figure 14D:
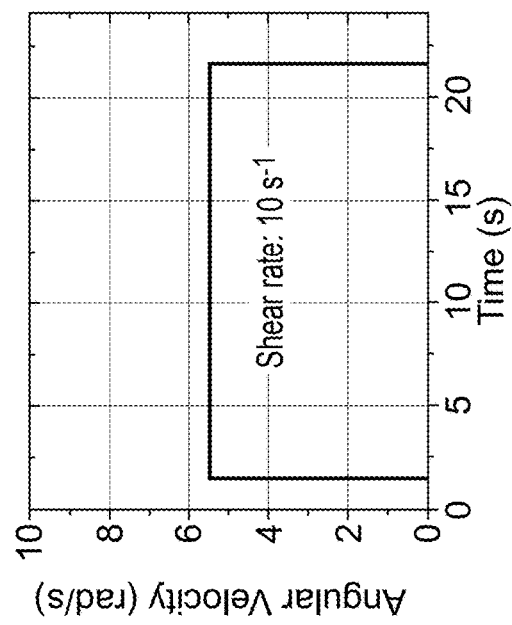

Several startup and stop tests with various rotational velocities were used to examine the performance of the exemplary sample cell, specifically for the 1-2 shear plane due to the right-angle gear drive. The encoder provided a measurement of output shaft displacement, and the data was compared to the theoretically optimal output (see FIGS. 14C and 14D).

Example 2. Comparison of Glycerol and Xanthan Gum

To validate and examine the 4-D rheo-SANS environment sample cell, a Newtonian fluid, glycerol, was investigated first and followed by the xanthan gum solution in the presence of a weakly associated microstructure that breaks readily under shear. The response of the sample cell was compared to measurements obtained from a commercial DHR rotational rheometer (TA Instruments, Delaware, USA). The measurements on the DHR rotational rheometer used a 40 mm, 2 degree cone-and-plate geometry in peak hold, small amplitude oscillation, and large amplitude oscillation measurement modes. The flow modes tested were selected to match the type of flow experiments typically performed in a rheo-SANS experiment. As shown in the results below, the exemplary sample cell in the 4-D rheo-SANS environment produced rheological measurement data showing excellent agreement with measurements from a commercial rheometer over a wide operating range, in multiple measurement modes, and for both Newtonian and non-Newtonian fluids. The results presented below confirmed that the sample cell can be used in a 4-D rheo-SANS environment to produce real rheological measurements in configurations suitable for performing SANS experiments in all three shear planes.

Glycerol—Peak Hold Flow Sweep

Figure 16A:
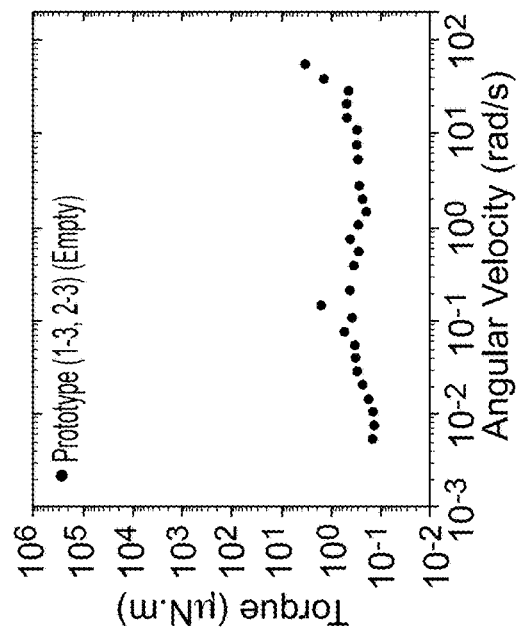
In FIG. 16A, the y-axis represents stress, and the x-axis represents shear rate.
Figure 16B:
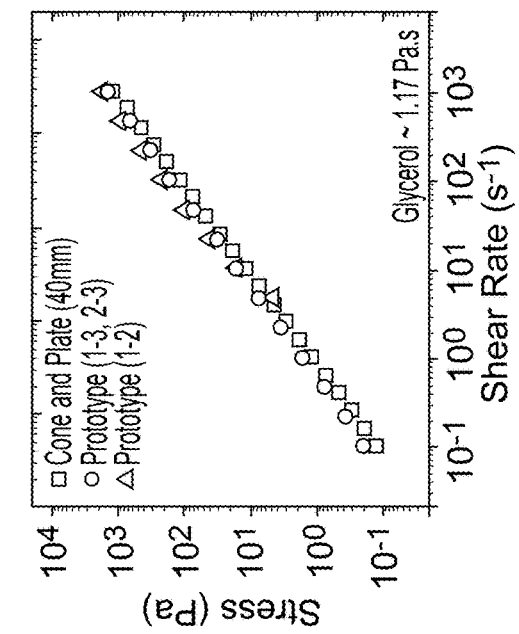

The sample cell was first tested for peak hold flow sweep using glycerol as the sample material. Stress versus strain measurements from the commercial rheometer with the cone and plate geometry (40 mm) were compared to the sample cell in the 4D-rheo SANS environment in 1-3, 2-3, and 1-2 shear planes. As shown in FIG. 16A, the data produced by the sample cell and the data produced by the commercial rheometer showed excellent agreement in all shear planes. Both the sample cell and the cone-and-plate showed the expected profile for the stress-shear rate relationship with a Newtonian behavior in the viscosity-shear rate relationship (see FIG. 16B). For the 1-2 shear plane, data in the lower shear rates (<10 s$^{-1}$) were cut off due to the normalization method to account for the empty cell friction used as previously described. While not intending to be bound by theory, it is possible that the low shear points are cut off because the sample inside the sample cell may provide support to the cell geometry leading to less fluctuation as compared to an empty cell.

Glycerol—Oscillation

Figure 17A:
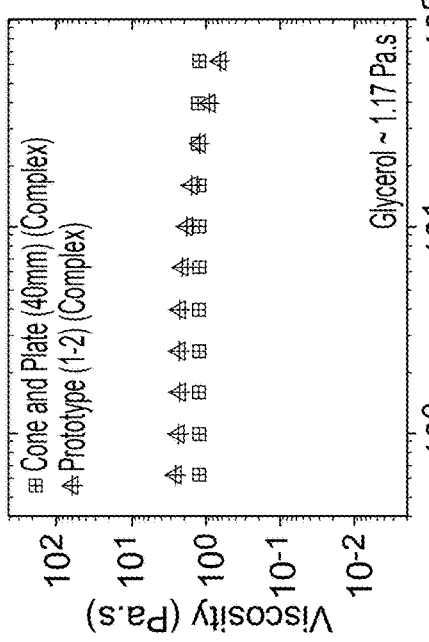
FIG. 17A is a comparison of steady shear and complex viscosity of glycerol in the sample-cell member in the 1-3, 2-3 shear plane and in the 40 mm cone-and-plate. The y-axis represents viscosity, and the x-axis represents shear rate.
Figure 18A:
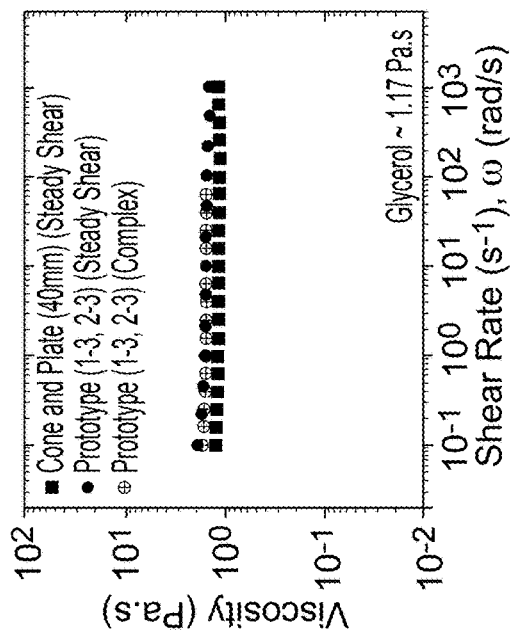
FIGS. 18A and 18B show the storage modulus, loss modulus of the 40 mm cone-and-pate compared to the sample-cell member using glycerol as the sample material. SAOS was performed in the 1-3, 2-3 shear plane (FIG. 18A), while LAOS was performed in the 1-2 shear plane (FIG. 18B). The y-axis represents storage modulus (G'), loss modulus (G"), and the x-axis represents vorticity (ω).
Figure 17B:
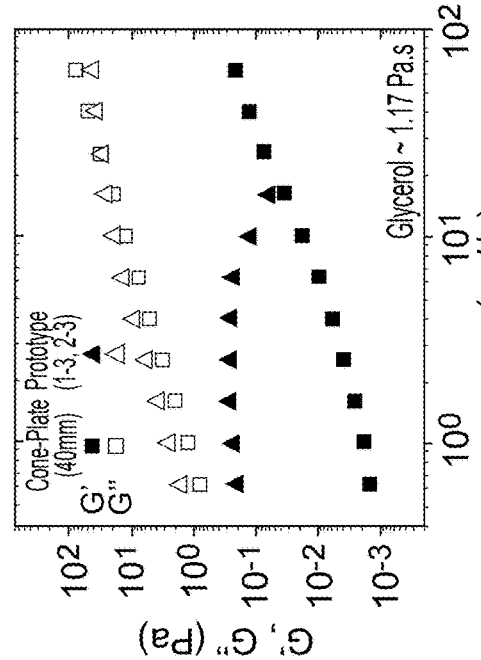
FIG. 17B compared complex viscosity of glycerol in the 40 mm cone-and-plate with glycerol in the sample cell oriented in 1-2 shear plane. SAOS was performed in the 1-3, 2-3 shear plane while LAOS was performed in the 1-2 shear plane. The y-axis represents viscosity, and the x-axis represents vorticity (ω).
Figure 18B:
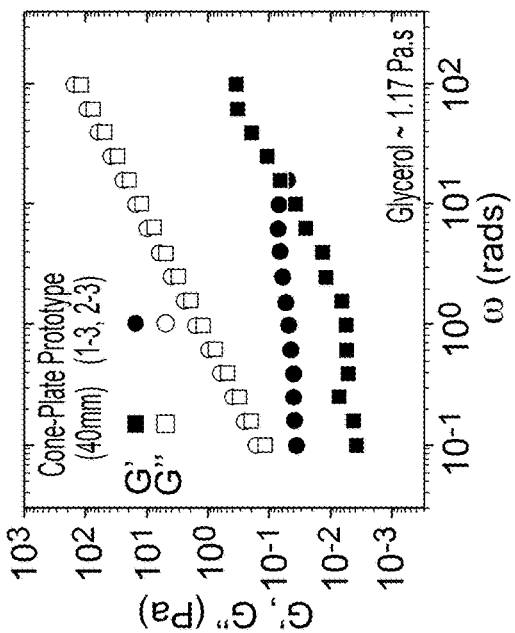

SAOS was performed with high precision in measuring torque at 1-3, 2-3 shear plane configurations. Complex viscosity matched well for the sample cell and the cone-and-plate as shown in FIG. 17A. In addition, LAOS was performed for the 1-2 shear plane, which showed that the complex viscosity aligned between the exemplary sample cell and the cone-and-plate as plotted in FIG. 17B. Loss moduli in the oscillation test using the sample cell in 1-3, 2-3 shear planes aligned with the loss moduli obtained from cone and plate, but storage moduli deviated between prototype and cone-and-plate as shown in FIG. 18A. This difference resulted from the sample inertia. For 1-2 shear plane, the observed results were similar for a higher storage modulus caused by the right-angle gear drive, as illustrated in FIG. 18B. Additionally, the performance for the 1-2 plane was limited by the right-angle gear drive. Therefore, the operating measurement window for the 1-2 shear plane was not as large as the 1-3 and 2-3 shear planes.

Xanthan Gum—Peak Hold Flow Sweep

Figure 19A:
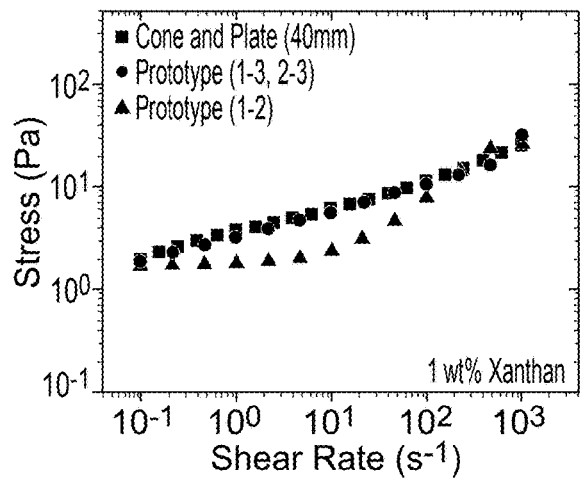
FIGS. 19A and 19B show the stress-shear (FIG. 19A) and viscosity-shear (FIG. 19B) relationships of 1 wt % xanthan gum sample for the 40 mm cone as compared to the sample-cell member. The sample-cell member was tested in the 1-3, 2-3, and 1-2 shear planes. A flow sweep test method of shear rate varying from $10\text{-}1\ s^{-1}$ to $103\ s^{-1}$ was performed.
Figure 19B:
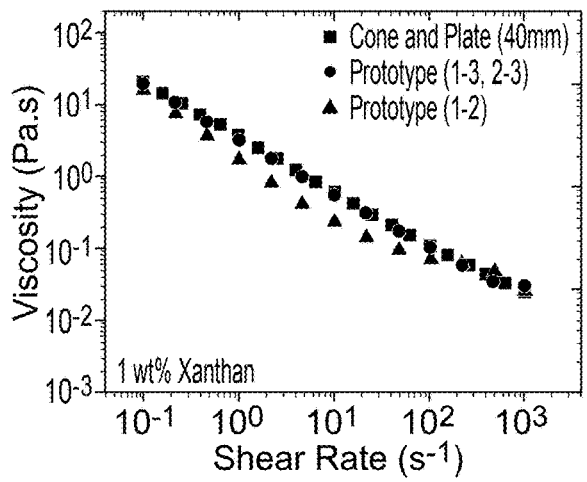

In the 1-3, 2-3 shear plane, the exemplary sample cell data aligns well with the cone-and-plate data for both stress-shear and viscosity-shear. However, the 1-2 shear plane data for the sample cell showed stress and viscosity greater than that of the cone-and-plate. While not intended to be bound by theory, one reason for this decrease in measured stress and viscosity may have derived from sample leaking during the particular experiment as a result of the 1-2 shear configuration. Decreased sample volume translated to less sample shearing within the cell; therefore, lower stress and viscosity for the same shear rates were shown in FIGS. 19A and 19B.

Xanthan Gum—Oscillation

Figure 20A:
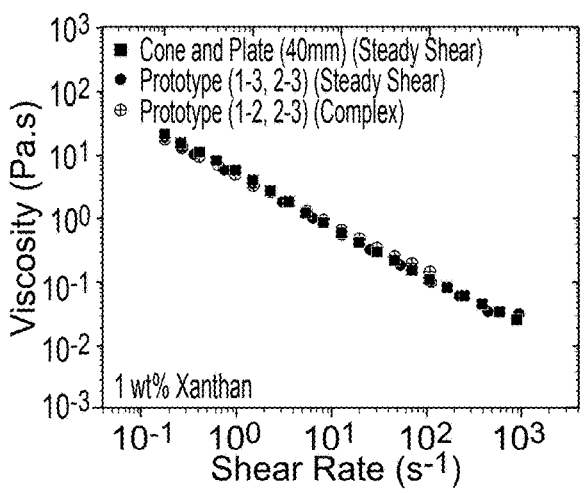
FIG. 20A is a comparison of steady shear and complex viscosity of 1 wt % xanthan gum in the sample-cell member in the 1-3, 2-3 shear plane as compared to the 40 mm cone-and-plate. The y-axis represents viscosity, and the x-axis represents shear rate.
Figure 20B:
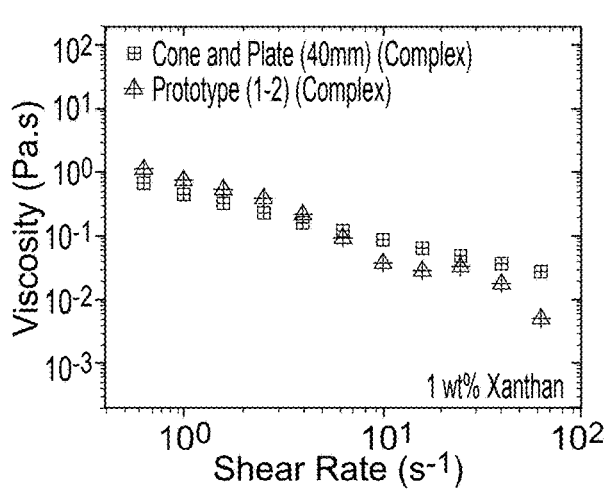
FIG. 20B compared complex viscosity of 1 wt % xanthan gum in the 40 mm cone-and-plate with 1 wt % xanthan gum in the sample-cell member oriented in the 1-2 shear plane. SAOS was performed in the 1-3, 2-3 shear plane, while LAOS was performed in the 1-2 shear plane. The y-axis represents viscosity, and the x-axis represents vorticity (ω).
Figure 21A:
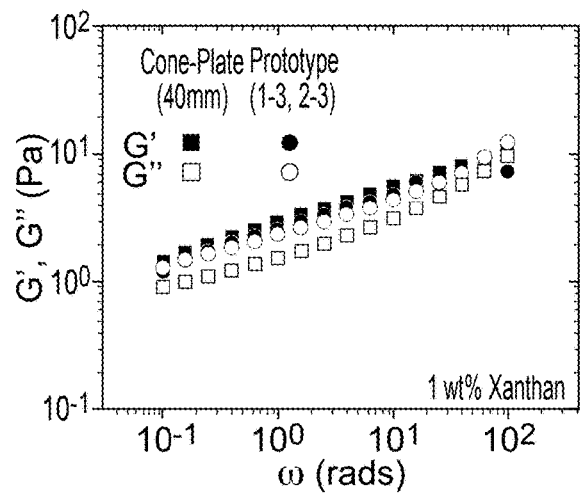
FIGS. 21A and 21B show the storage modulus, loss modulus of the 40 mm cone-and-pate compared to the sample-cell member using 1 wt. % xanthan gum as the sample material. SAOS was performed in the 1-3, 2-3 shear plane (FIG. 21A), while LAOS was performed in the 1-2 shear plane (FIG. 21B). The y-axis represents storage modulus (G'), loss modulus (G"), and the x-axis represents vorticity (ω).
Figure 21B:
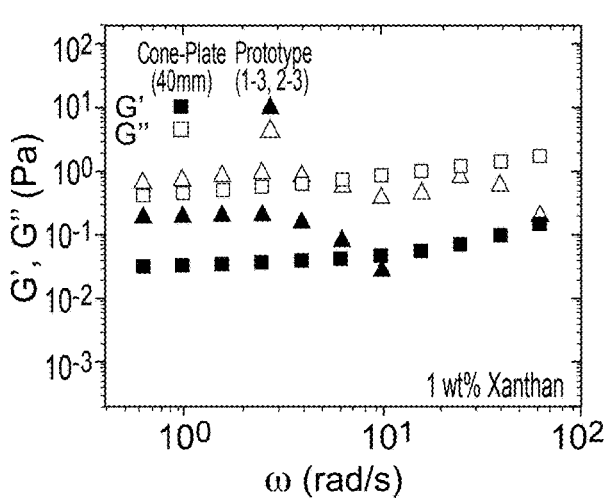

As shown in FIG. 20, complex viscosity of xanthan in SAOS (FIG. 20A) and LAOS (FIG. 20B) at all shear planes in the exemplary sample cell aligned with the data for the cone-and-plate. Loss moduli from the sample cell at all configurations matched each other. However, similar to what was observed with glycerol, the storage moduli from the sample cell was higher than the storage moduli from the cone-and-plate (see FIGS. 21A and 21B). Non-Newtonian (shear-thinning) behaviors of xanthan gum solution aligned well between the sample cell and the cone-and-plate, which confirmed the capability of measuring complex fluids in the designed prototype.

Figure 24:
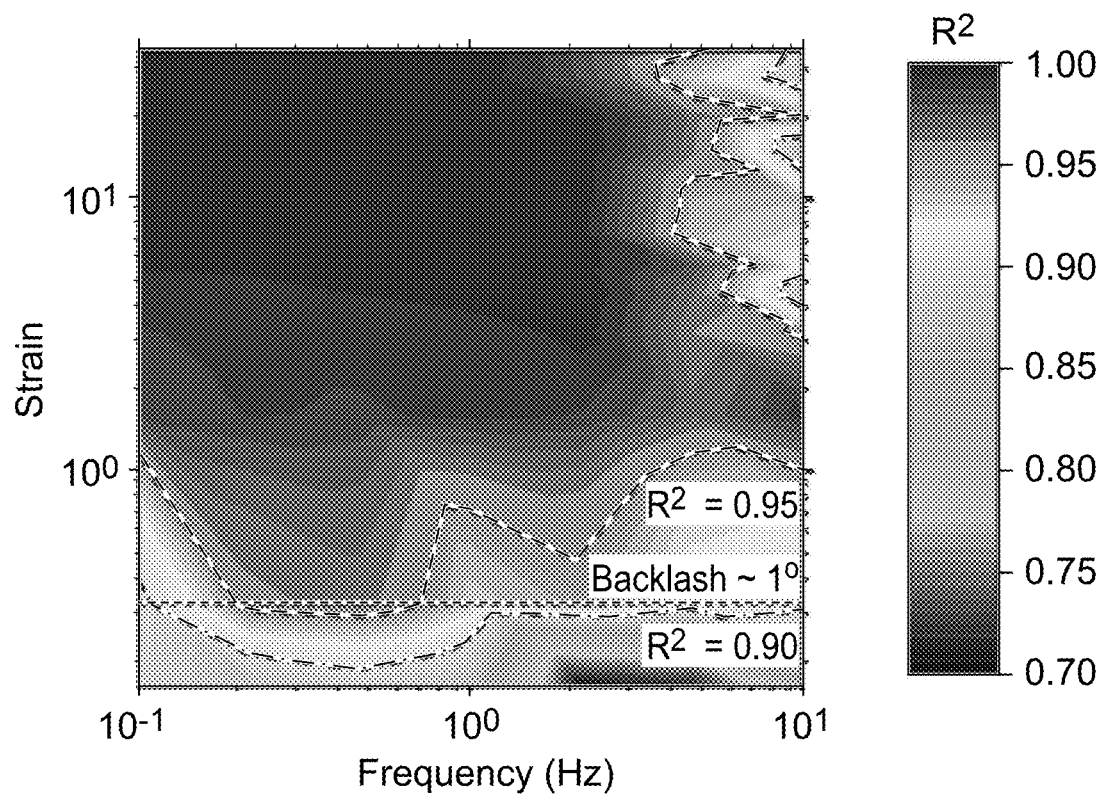
FIG. 24 is heat map of the strain-frequency operating window of right-angle gear drive for LAOS experimentation. The y-axis represents strain, and the x-axis represents frequency.

For the oscillation test, the limitation of measuring rheological properties at the 1-2 shear plane was the use of the right-angle gear drive. Hence, an operating window was constructed by calculating the correlation ($R^2$ value) between measured displacement waveform and the theoretical counterpart as shown in FIGS. 22A and 22B. By using the encoder, the displacement generated from the rheometer through the gear drive to the output shaft was recorded. Due to the backlash caused by the space between the gear teeth, a waveform with a flat peak was observed using strain 0.16 (see FIG. 22A), and this flat peak resulted in a lower $R^2$ value. When the oscillation amplitude was increased, such as strain 15, the $R^2$ value reached 0.998 (see FIG. 22B). FIG. 23 is a chart of various frequencies and strain amplitudes generated by this method, and this data was further converted into a heat map and plotted in FIG. 24 to indicate the available operating window for oscillatory tests using the prototype in the 1-2 shear plane configuration. In this map, the operating window was defined as the region where the input to output waveforms have correlation $R^2$>0.95. When using a low strain similar to the backlash of the gear drive, the waveform was non-sinusoidal and poor correlation indicated the lower bound of train that defined the operating window. At a high frequency, inertial effects caused deviation from the theoretically-optimal output waveform and serve as an upper bound in frequency.

Xanthan Gum—Flow Startup (Stress Growth) Flow Stop (Stress Relaxation)

Figure 25:
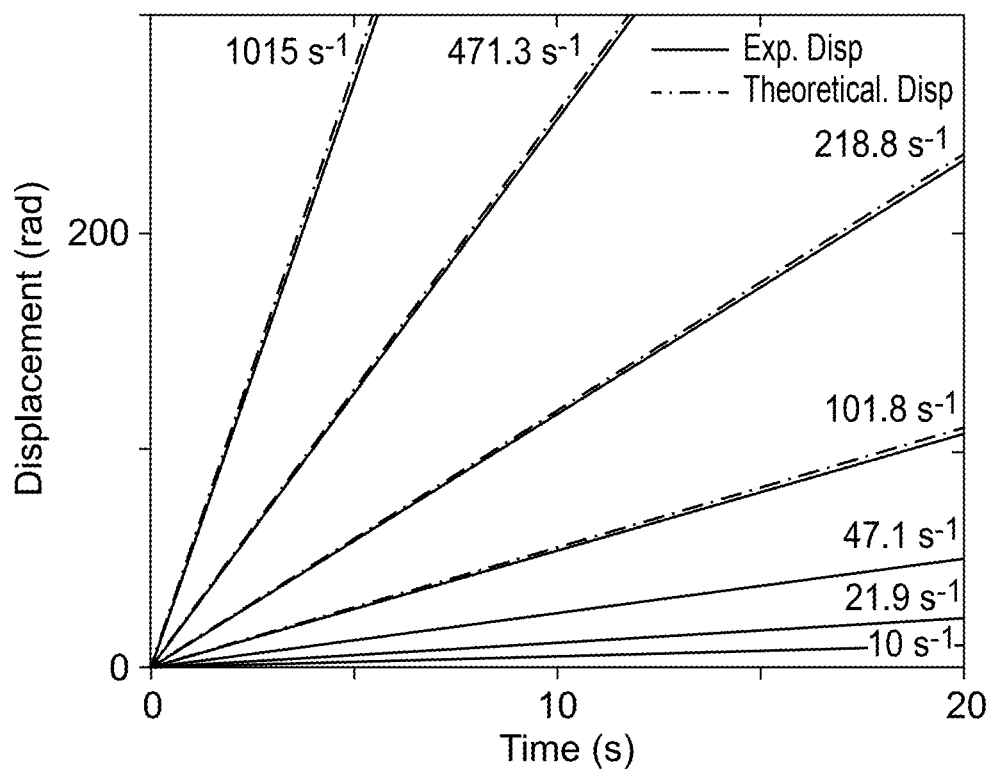
FIG. 25 is a graph showing the stress growth (startup) testing of the right-angle gear drive at shear rates varying from $10\ s^{-1}$-$1015\ s^{-1}$. Experimental and theoretical displacement at shear rates are shown by the solid line and dotted line, respectively. The y-axis represents displacement, and the x-axis represents time.
Figure 26A:
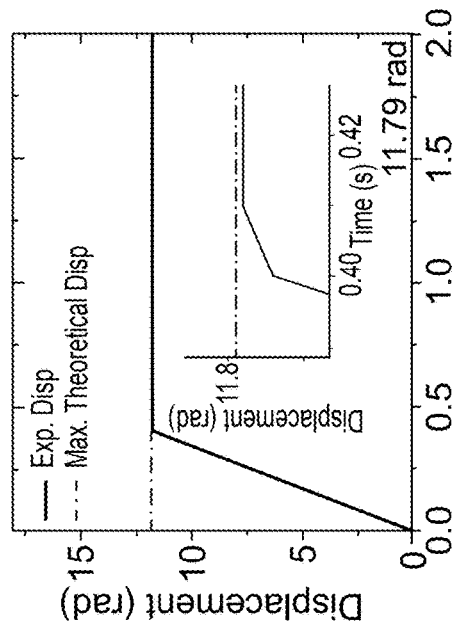
FIG. 26 shows the stress relaxation of the right-angle gear drive at displacements of 5.47 rad (FIG. 26A), 11.79 rad (FIG. 26B), 25.39 rad (FIG. 26C), and 54.7 rad (FIG. 26D).
Figure 26B:
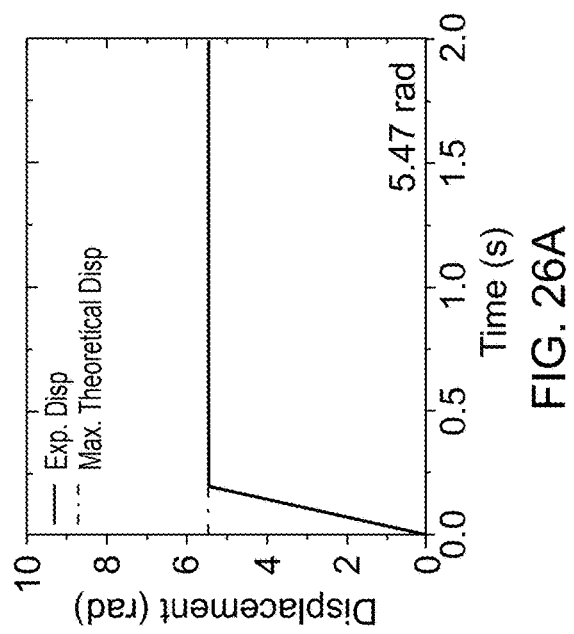
Figure 26C:
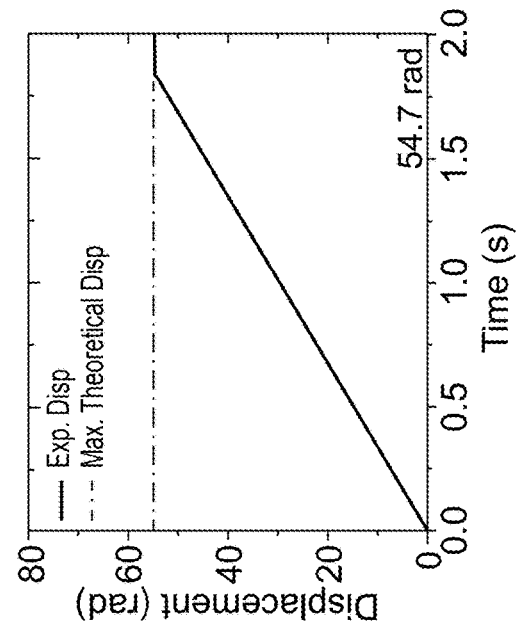
Figure 26D:
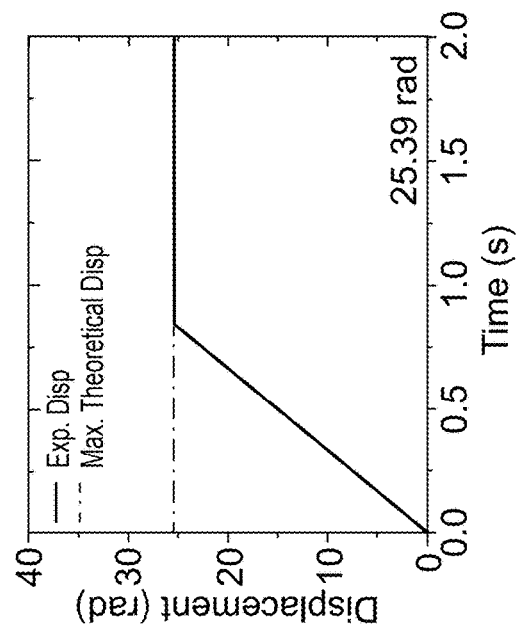

To further examine the capability of the right-angle gear drive, a flow startup method was used with a series of rotational velocities. The displacement recorded by the encoder matched well with the theoretical displacement (see FIG. 25). Therefore, the right-angle gear drive and sample cell described herein were suitable to generate the desired displacement profiles during flow startup tests.

While not intending to be bound by theory, the backlash of the right-angle gear drive potentially caused an overshoot in displacement when performing flow stop tests. However, the experimental testing of the stress relaxation experimental profile showed that such effects were minimal for the sample cell. The recorded displacement produced by the right-angle gear drive did not show a significant difference from the maximum theoretical displacement when the rotor stopped (see FIG. 26).

In summary, the exemplary sample cell in the 4D Rheo-SANS environment was successfully demonstrated and validated against a range of relevant Newtonian and non-Newtonian, complex fluids for use in probing neutron scattering in all three planes of flow.

We claim:

1. A sample cell for simultaneous measuring of rheological properties and interrogation of microstructure in all three primary planes defined by a simple shear field, the sample cell comprising:
    a) a cell geometry comprising a cylinder; a shaft; a lateral wall and a sidewall, wherein the sidewall extends both above the lateral wall to form an upper circumferential lip and below the lateral wall to form a lower circumferential lip, and wherein the shaft extends axially from the lateral wall;
    b) an enclosure comprising:
        (i) a base portion comprising a bottom inner surface; and a lower groove configured to receive the lower circumferential lip of the cell geometry to allow rotation of the lower circumferential lip within the lower groove;
        (ii) a cover portion comprising: (A) a top inner surface; (B) a bore for receiving the shaft of the cell geometry to allow rotation of the shaft within the bore; an upper groove configured to receive the upper circumferential lip of the cell geometry to allow rotation of the upper circumferential lip within the upper groove; and
        (iii) a circumferential barrier wall that extends upwardly from the bottom inner surface of the base portion to the top inner surface of the cover portion thereby forming a circular compartment outwardly concentric to the cylinder of the cell geometry, wherein the cylinder of the cell geometry and the circumferential barrier wall form a concentric space for receiving a sample material;
    c) a right-angle gear drive in mechanical communication with the shaft of the cell geometry and configured for mechanical communication with a rotational rheometer shaft; and
    d) a coating disposed on surfaces within the circular compartment and further disposed on the cylinder of the cell geometry;
    wherein the shaft is configured to rotate within the bore of the cover portion without making contact with the cover portion, the cylinder is configured to rotate within the enclosure without making contact with the base portion or the cover portion, and the coating prevents leakage of a sample material from the concentric space.

2. The sample cell of claim 1, wherein the coating is a hydrophobic coating selected from the group consisting of silicone, a combination polytetrafluoroethylene/silicone lubricant, polytetrafluoroethylene, a "lotus-leaf" inspired superhydrophobic coating, a nanoparticle coating, an oleophilic polymer, rubber, oil, a hydrocarbon greases, and any combination thereof.

3. The sample cell of claim 1, further comprising a sample material disposed within the concentric space, wherein the cylinder applies an external stress to the sample material when the shaft is rotated by the right-angle gear drive.

4. The sample cell of claim 1, wherein the right-angle gear drive further comprises a first drive shaft at an angle of about 90 degrees in relation to a second drive shaft, wherein the first drive shaft and the second drive shaft are supported by one or more bearings or bushings, and wherein the first drive shaft contacts the second drive shaft through a right-angle gearing.

5. The sample cell of claim 1, wherein:
    (a) the base portion comprises at least one sidewall, wherein the sidewall comprises a first radiation beam window for receiving a beam of radiation selected from the group consisting of neutron radiation, X-ray radiation, photon radiation in a visible wavelength spectrum, ultraviolet radiation, and infrared radiation and a second radiation beam window for receiving a beam of radiation selected from the group consisting of neutron radiation, X-ray radiation, photon radiation in the visible wavelength spectrum, ultraviolet radiation, and infrared radiation; or
    (b) the cover portion comprises a third radiation beam window for receiving a beam of radiation selected from the group consisting of neutron radiation, X-ray radiation, photon radiation in the visible wavelength spectrum, ultraviolet radiation, and infrared radiation; or
    (c) both (a) and (b).

6. The sample cell of claim 5, wherein the first radiation beam window, the second radiation beam window, the cover portion, or any combination thereof comprise beryllium-quartz and the beam of radiation is X-ray and/or neutron radiation.

7. The sample cell of claim 1, wherein the right-angle gear drive is in mechanical communication with a rheometer.

8. The sample cell of claim 1, wherein the base portion is disposed on a heat exchanger configured to circulate fluid for controlling a temperature of the sample cell, the temperature selected from a temperature range of about −35 degrees C. to about 150 degrees C.

9. A 4D-rheo assembly comprising:
    (a) support assembly comprising a first cell support and a second cell support;
    (b) a sample cell member comprising:
        (i) a cell geometry comprising a cylinder and a shaft;
        (ii) an enclosure comprising:
            (1) a base portion comprising a bottom inner surface;
            (2) a cover portion comprising: (A) a top inner surface; and (B) a bore configured to receive the shaft of the cell geometry to allow rotation of the shaft within the bore; and
            (3) a circumferential barrier wall that extends upwardly from the bottom inner surface of the base portion to the top inner surface of the cover portion thereby forming a circular compartment outwardly concentric to the cylinder of the cell geometry whereby the cylinder of the cell geometry and the circumferential barrier wall form a concentric space configured to receive a sample material; and
(iii) a coating disposed on surfaces within the circular compartment and further disposed on the cylinder of the cell geometry;

wherein the shaft is configured to rotate within the bore of the cover portion without making contact with the cover portion, wherein the cylinder is configured to rotate within the enclosure without making contact with the base portion or the cover portion, and wherein the coating prevents leakage of a sample material from the concentric space; and wherein, when the sample cell member is disposed on the first cell support in an XY orientation, the sample cell member is configured to receive a beam of radiation in 1-3, 2-3 shear planes; and wherein, when the sample cell member is disposed on the second cell support in an XYZ orientation, the shaft of the cell geometry is in mechanical communication with a right-angle gear drive and the sample cell member is configured to receive a beam of radiation in the 1-2 shear plane.

10. The 4D-rheo assembly of claim 9, wherein:
the cylinder of the cell geometry further comprises a lateral wall and a sidewall, wherein the sidewall extends both above the lateral wall to form an upper circumferential lip and below the lateral wall to form a lower circumferential lip, and wherein the shaft extends axially from the lateral wall;
the bottom inner surface further comprises a lower groove configured to receive the lower circumferential lip of the cell geometry to allow rotation of the lower circumferential lip within the lower groove; and
the top inner surface further comprises an upper groove configured to receive the upper circumferential lip of the cell geometry to allow rotation of the upper circumferential lip within the upper groove.

11. The 4D-rheo assembly of claim 9, wherein the coating is a hydrophobic coating or a hydrophilic coating.

12. The 4D-rheo assembly of claim 11, wherein the coating is a hydrophobic coating selected from the group consisting of silicone, a combination polytetrafluoroethylene/silicone lubricant, polytetrafluoroethylene, a "lotus-leaf" inspired superhydrophobic coating, a nanoparticle coating, an oleophilic polymer, rubber, oil, a hydrocarbon greases, and any combination thereof.

13. The 4D-rheo assembly of claim 11, wherein the coating is a hydrophilic coating selected from the group consisting of polyethyleneoxide, an amide, a polyimide, polyvinylpyrrolidone, polyvinyl alcohol, a polyurethane, polyacrylic acid, a polysaccharide, a Pluronic block copolymer, a biopolymer, and any combination thereof.

14. The 4D-rheo assembly of claim 9, wherein the base portion, cover portion, cylinder, circumferential barrier wall, or any combination thereof comprise a material selected from the group consisting of stainless steel, titanium, beryllium-quartz, and aluminum.

15. The 4D-rheo assembly of claim 9, wherein:
(a) the sample cell member is disposed on the first cell support in the XY orientation and the shaft of the cell geometry is configured for mechanical communication with a rheometer shaft; or
(b) wherein the sample cell member is disposed on the second cell support in the XYZ orientation and the shaft of the cell geometry is in mechanical communication with a right-angle gear drive, wherein the right-angle gear drive is configured for mechanical communication with a rheometer shaft.

16. The 4D-rheo assembly of claim 15, wherein the sample cell member is disposed on the second cell support in the XYZ orientation and the shaft of the cell geometry is in mechanical communication with a right-angle gear drive, wherein the right-angle gear drive further comprises a first drive shaft at an angle of about 90 degrees in relation to a drive second shaft, wherein the first drive shaft and the second drive shaft are supported by one or more bearings or bushings, and wherein the first drive shaft contacts the second drive shaft through a right-angle gearing.

17. The 4D-rheo assembly of claim 9, wherein:
(a) the base portion of the sample cell member comprises at least one sidewall, wherein the sidewall comprises a first radiation beam window configured to receive a beam of radiation selected from the group consisting of neutron radiation, X-ray radiation, photon radiation in a visible wavelength spectrum, ultraviolet radiation, and infrared radiation and a second radiation beam window configured to receive a beam of radiation selected from the group consisting of neutron radiation, X-ray radiation, photon radiation in the visible wavelength spectrum, ultraviolet radiation, and infrared radiation; or
(b) the cover portion of the sample cell member comprises a third radiation beam window configured to receive a beam of radiation selected from the group consisting of neutron radiation, X-ray radiation, photon radiation in the visible wavelength spectrum, ultraviolet radiation, and infrared radiation; or
(c) both (a) and (b).

18. The 4D-rheo assembly of claim 17, wherein the first radiation beam window, the second radiation beam window, the cover portion, or any combination thereof comprise beryllium-quartz and the beam of radiation is X-ray radiation or neutron radiation.

19. The 4D-rheo assembly of claim 9, wherein the shaft of the cell geometry is in mechanical communication with a rheometer.

20. A method of analyzing a sample material, comprising:
(a) providing the 4D-rheo assembly of claim 9;
(b) disposing the sample material within the concentric space;
(c) rotating the shaft of the cell geometry whereby an external rotational stress is applied to the material;
(d) applying a beam of neutron radiation to the sample cell member; and
(e) detecting a scattering plane image.

21. The method of claim 20, wherein the sample material is a non-Newtonian sample material.

22. The method of claim 20, wherein the sample cell member is disposed on the second cell support in the XYZ orientation and the shaft of the cell geometry is in mechanical communication with a right-angle gear drive, wherein the right-angle gear drive is configured for mechanical communication with a rheometer shaft.

* * * * *